United States Patent
US010810581B2

(12) United States Patent
Govindarajan et al.

(10) Patent No.: US 10,810,581 B2
(45) Date of Patent: Oct. 20, 2020

(54) SECURE OFFLINE TRANSACTION SYSTEM USING DIGITAL TOKENS AND A SECURE LEDGER DATABASE

(71) Applicant: PAYPAL, INC., San Jose, CA (US)

(72) Inventors: Satish Narayan Govindarajan, San Jose, CA (US); Anantharaj Uruthiralingam, San Jose, CA (US); Carlos Rivas, San Jose, CA (US); Srikanth Nandiraju, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 308 days.

(21) Appl. No.: 15/716,013

(22) Filed: Sep. 26, 2017

(65) Prior Publication Data

US 2019/0095907 A1   Mar. 28, 2019

(51) Int. Cl.
*G06Q 20/36* (2012.01)
*G06Q 20/38* (2012.01)
(Continued)

(52) U.S. Cl.
CPC ........... *G06Q 20/367* (2013.01); *G06F 16/00* (2019.01); *G06Q 20/382* (2013.01);
(Continued)

(58) Field of Classification Search
CPC .. G06Q 20/367; G06Q 20/382; G06Q 20/389; G06Q 20/401; G06Q 20/16;
(Continued)

(56) References Cited

U.S. PATENT DOCUMENTS 9,317,018 B2*  4/2016  Spodak ..................... G06K 7/01
9,406,063 B2*  8/2016  Zhou ................... G06Q 20/3227
(Continued)

OTHER PUBLICATIONS

"FORCE—Fully Off-line secuRe CrEdits for Mobile Micro Payments", Vanesa Daza, Roberto Di Pietro, Flavio Lombardi and Matteo Signorini; Published in Aug. 1, 2014, 11th International Conference on Security and Cryptography (SECRYPT) (pp. 1-12) (Year: 2014).*

(Continued)

*Primary Examiner* — Patrick McAtee
*Assistant Examiner* — Edgar R Martinez-Hernandez
(74) *Attorney, Agent, or Firm* — Haynes and Boone, LLP

(57) ABSTRACT

A payer transaction device enables secure offline transactions using a secure element providing a secure payer account database, a secure ledger database, and a wallet application. While the payer transaction device is not connected to the Internet, the wallet application receives a payee identifier and a transaction amount and verifies that the transaction amount is less than an available payer account balance in the secure payer account database. In response, the wallet application creates a digital token that allocates the transaction amount from the payer account balance to the payee identifier, and records the digital token in a payer secure ledger in the secure ledger database, which reduces the available payer account balance by the transaction amount. The wallet application then transfers the digital token to a payee transaction device over a peer-to-peer wireless connection and, subsequently, the digital token is synchronized with a ledger tracking system through the Internet.

20 Claims, 15 Drawing Sheets

(51) Int. Cl.
*G06Q 20/40* (2012.01)
*G06F 16/00* (2019.01)
*H04L 9/12* (2006.01)
*H04L 9/32* (2006.01)

(52) U.S. Cl.
CPC ......... *G06Q 20/389* (2013.01); *G06Q 20/401* (2013.01); *H04L 9/12* (2013.01); *H04L 9/3239* (2013.01); *H04L 9/3247* (2013.01); *G06Q 2220/14* (2013.01); *H04L 2209/38* (2013.01); *H04L 2209/56* (2013.01); *H04L 2209/80* (2013.01)

(58) Field of Classification Search
CPC .... G06Q 20/32; G06Q 20/0658; G06Q 20/40; G06F 16/00; H04L 2209/56; H04L 9/3228; H04W 12/04
See application file for complete search history.

(56) References Cited

U.S. PATENT DOCUMENTS

| | | | | |
|---|---|---|---|---|
| 10,022,613 | B2* | 7/2018 | Tran | A41D 1/00 |
| 10,134,032 | B2* | 11/2018 | Govindarajan | G06Q 20/34 |
| 10,380,577 | B2* | 8/2019 | Govindarajan | G06Q 20/32 |
| 2015/0170112 | A1* | 6/2015 | DeCastro | G06Q 20/381 |
| | | | | 705/39 |
| 2015/0324789 | A1* | 11/2015 | Dvorak | G06Q 20/3274 |
| | | | | 705/67 |
| 2016/0034876 | A1* | 2/2016 | Speiser | G06Q 20/223 |
| | | | | 705/21 |
| 2016/0125403 | A1* | 5/2016 | Hu | G06Q 20/3276 |
| | | | | 705/71 |
| 2016/0260169 | A1* | 9/2016 | Arnold | G06Q 40/12 |
| 2017/0011460 | A1* | 1/2017 | Molinari | G06F 21/645 |
| 2017/0103458 | A1* | 4/2017 | Pierce | G06Q 20/381 |
| 2017/0213212 | A1* | 7/2017 | Dicker | G06Q 20/3821 |
| 2017/0230345 | A1* | 8/2017 | Piqueras Jover | H04L 9/321 |
| 2018/0005244 | A1* | 1/2018 | Govindarajan | G06Q 20/40 |
| 2018/0204191 | A1* | 7/2018 | Wilson | H04L 9/30 |
| 2018/0276663 | A1* | 9/2018 | Arora | G06Q 20/3829 |
| 2018/0322489 | A1* | 11/2018 | Altenhofen | H04L 9/3239 |
| 2019/0197517 | A1* | 6/2019 | Senguttuvan | G06Q 20/227 |

OTHER PUBLICATIONS

"Thing-to-thing electricity micro payments using blockchain technology", Thomas Lundqvist • Andreas de Blanche • H. Robert H. Andersson; Published in Jun. 1, 2017, Global Internet of Things Summit (GIoTS) (pp. 1-6) (Year: 2017).*

* cited by examiner

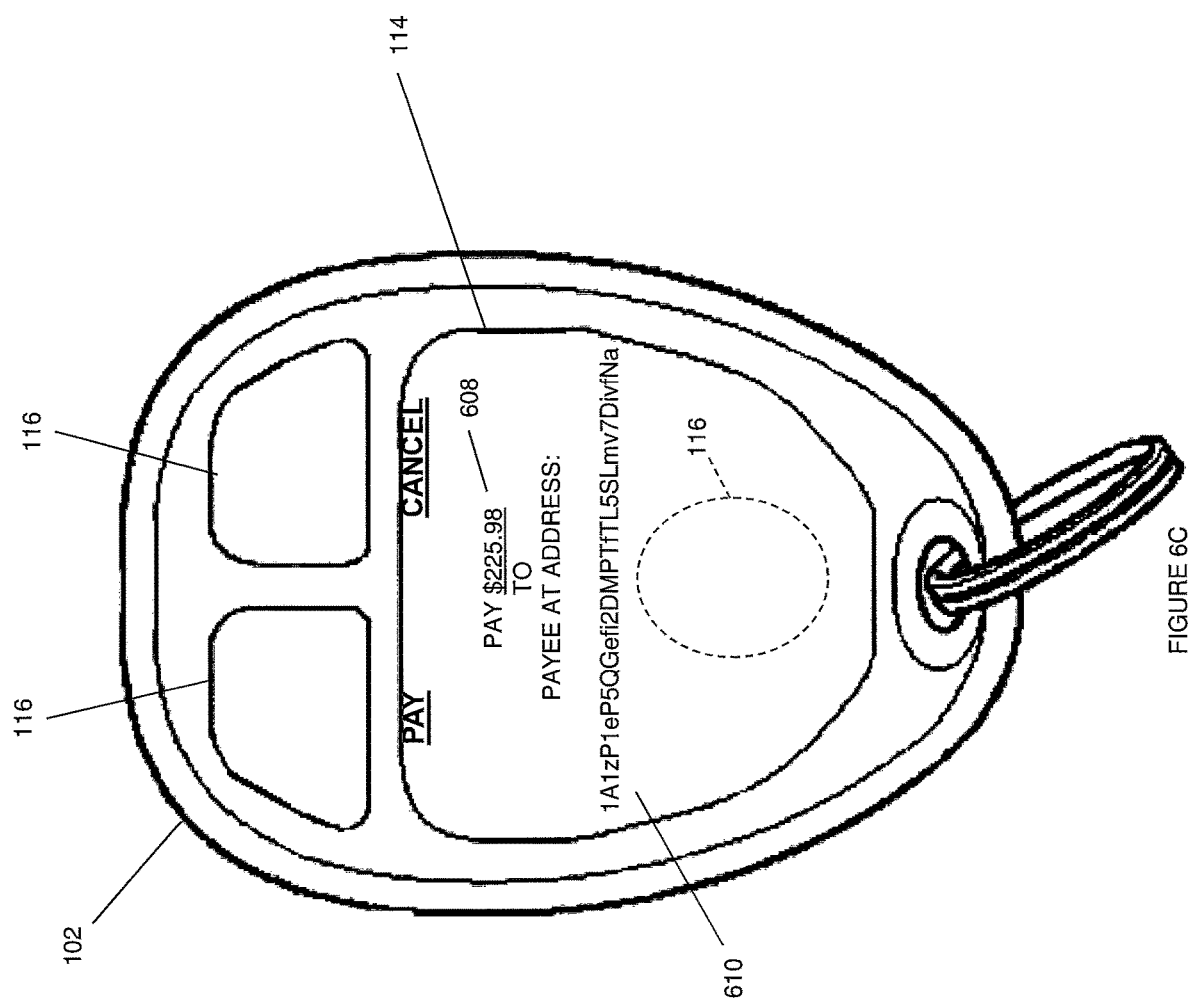

SECURE OFFLINE TRANSACTION SYSTEM USING DIGITAL TOKENS AND A SECURE LEDGER DATABASE

BACKGROUND

Field of the Disclosure

The present disclosure generally relates to electronic and/or mobile transactions, and more particularly to a secure offline transaction system for conducting transactions between two parties without an Internet connection using digital tokens and a secure ledger database.

Related Art

More and more consumers are purchasing items and services and/or otherwise conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

However, there are times when parties may desire to conduct a transaction when no Internet connection to the payment service provider is available (e.g., an "offline" transaction). However, performing offline electronic and/or mobile transactions without an Internet connection to the payment service provider is problematic, as the payment service provider typically participates in online electronic and/or mobile transaction by authenticating the payer and confirming that the payer includes a payer account with sufficient funds to cover the transaction. As such, with the Internet connection to the payment service provider unavailable, the payee cannot be sure that funds promised by the payer as part of the offline transaction will actually be transferred to a payee account of the payer and may result in fraudulent transactions. This results in many payees refusing to participate in offline electronic and/or mobile transactions, and instead strictly utilizing cash or other physical currency instruments when performing transactions without an available Internet connection.

Thus, there is a need for a secure offline transaction system.

BRIEF DESCRIPTION OF THE FIGURES

FIG. 6C is a front view illustrating an embodiment of the payer transaction device of FIG. 1B displaying a transaction amount and a payee identifier for an offline transaction.

Figure 1A:
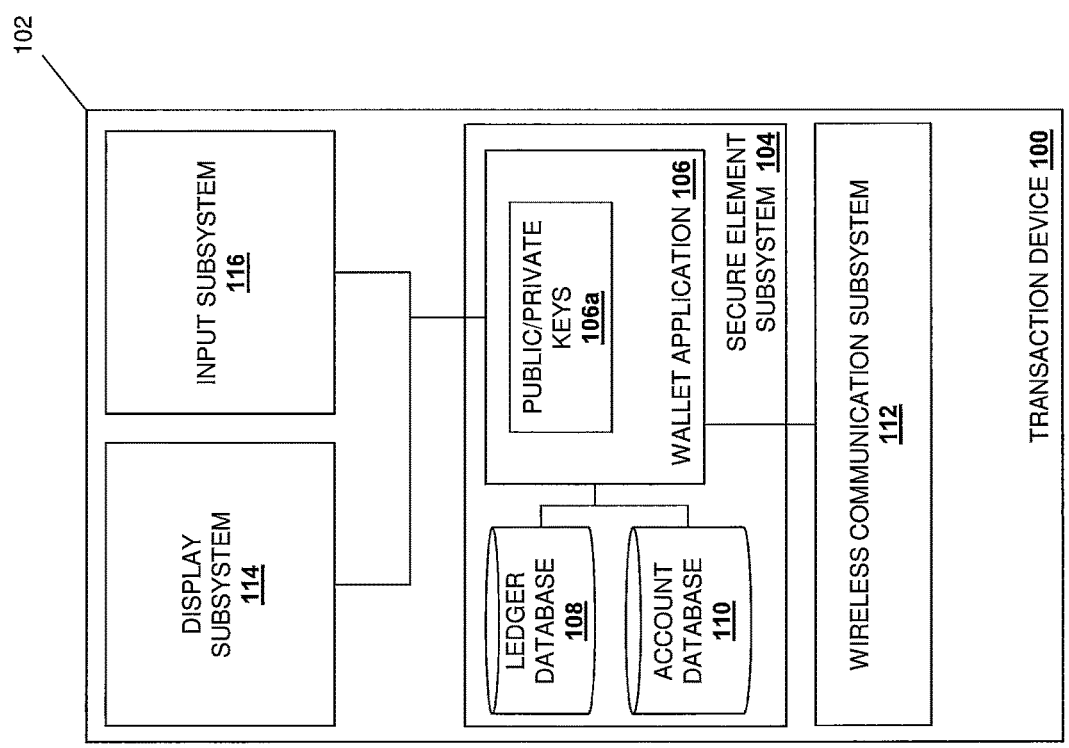
FIG. 1A is a schematic view illustrating an embodiment of a transaction device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing secure, offline transaction between payer transaction devices and payee transaction devices by recording digital or electronic tokens created by the payer transaction device during an offline transaction in payer secure ledgers and payee secure ledgers that are stored in respective secure element subsystems in each of the payer transaction devices and the payee transaction devices. For example, in an offline transaction, a wallet application running in the secure element subsystem in the payer transaction device may create the digital token by utilizing a private key to sign the offline transaction in order allocate a transaction amount associated with a payer public address controlled by the payer to a payee public address controlled by the payee. The payer transaction device may then use a local, peer-to-peer wireless connection to share that signed offline transaction with the payee transaction device, and each of the payer transaction device and payee transaction device may store that signed offline transaction in respective payer and payee secure ledgers that are include in the secure element subsystems on the payer transaction device and payee transaction device. The payer transaction device and/or the payee transaction device may then utilize local, peer-to-peer wireless connections to share that signed offline transaction with any local device they come in communication with, and any device that receives the signed offline transaction may subsequently share it in the same manner in order to distribute the signed offline transaction. When a subsequent connection to the Internet becomes available to any device that has received the signed offline transaction, the digital token may then be synchronized with at least one ledger tracking system by, for example, broadcasting the signed offline transaction over the connection to the Internet to at least one ledger tracking system. The secure element subsystem in the payer transaction device includes a payer account database that stores the available payer account balance for the payer, and is checked by the wallet application in the secure element subsystem on the payer transaction device before allocating transaction amounts to offline transaction, which ensures that the payer has sufficient funds to satisfy offline transactions. As such, secure offline transactions between payer transaction devices and payee transaction device are provided even when a connection to the Internet is unavailable.

Figure 1B:
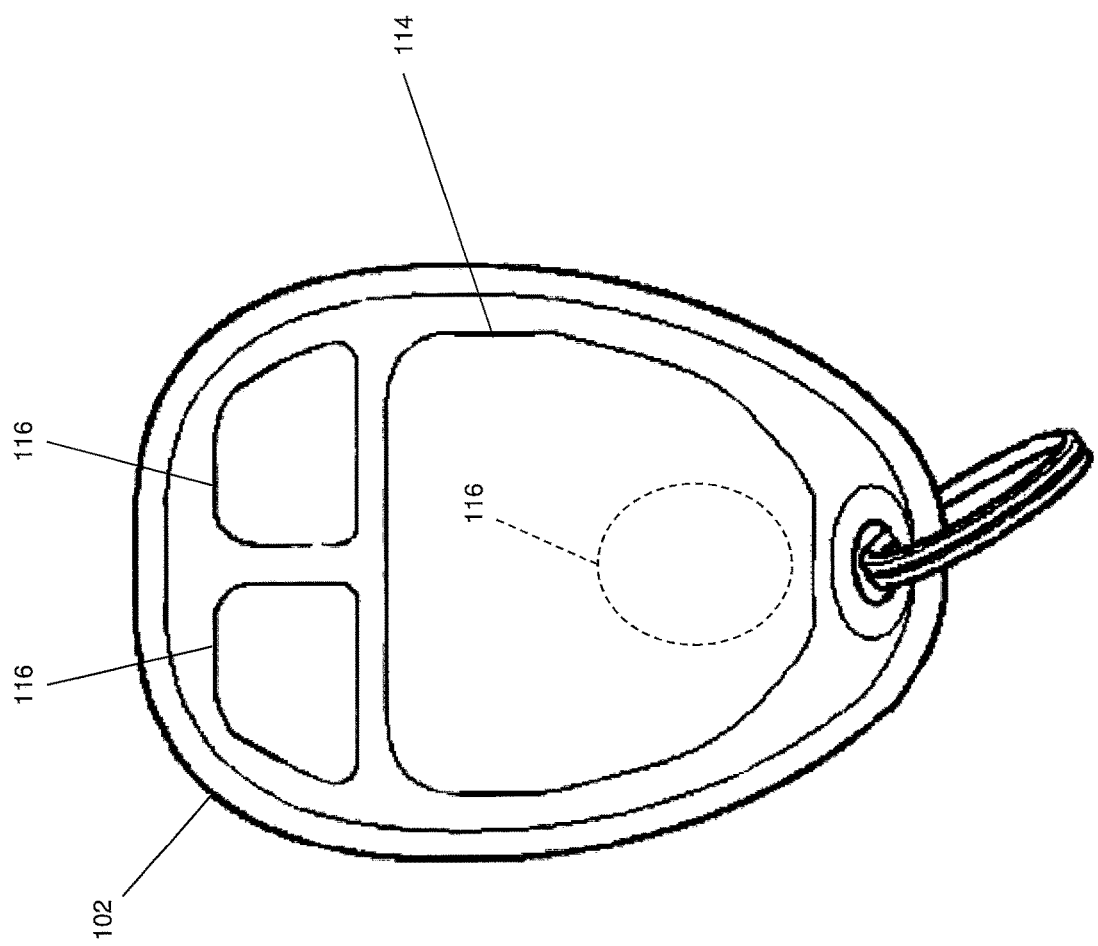
FIG. 1B is a front view illustrating an embodiment of a payer transaction device that may be provided by the transaction device of FIG. 1A.
Figure 1C:
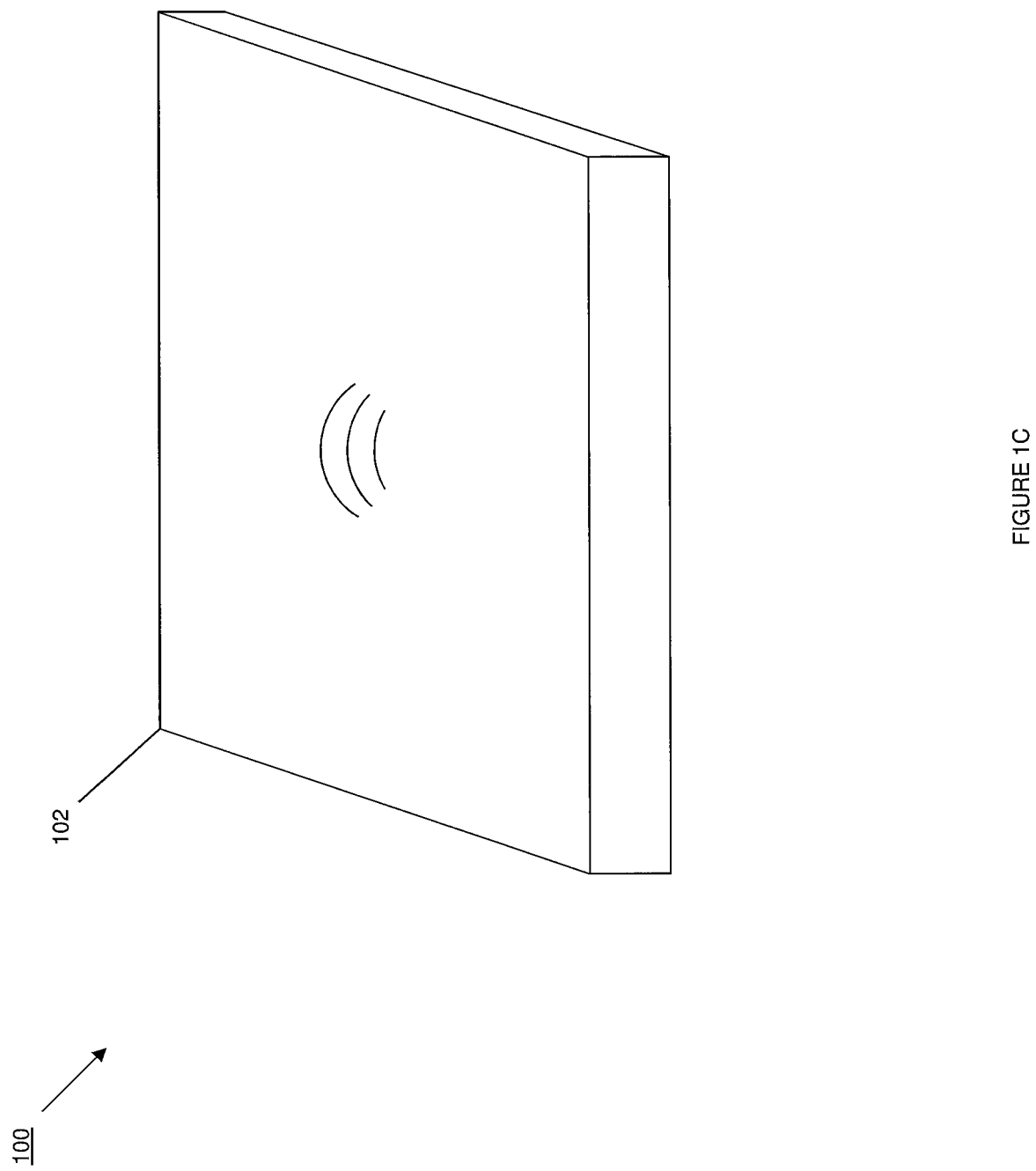
FIG. 1C is a perspective view illustrating an embodiment of a payee transaction device that may be provided by the transaction device of FIG. 1A.

Referring now to FIGS. 1A, 1B, and 1C, embodiments of transaction devices 100 are illustrated, and may be provided to utilize the computer system 800 discussed below with reference to FIG. 8, or components of that computer system 800. As discussed below, FIG. 1B illustrates an embodiment of a payer transaction device used in the examples described below, while FIG. 1C illustrates an embodiment of a payee transaction device used in the examples described below, and one of skill in the art in possession of the present disclosure will appreciate that the payer transaction devices and payee transaction devices described herein may utilize different subsets of the features illustrated for the transaction device 100 of FIG. 1A (e.g., the payer transaction device illustrated in FIG. 1B includes a display subsystem and input subsystems, while the payee transaction device illustrated in FIG. 1C does not include a display subsystem and input subsystems, and instead connects locally to a payee computing device to enable display and input functionality.) As such, a wide variety of modifications to the transaction devices discussed below is envisioned as falling within the scope of the present disclosure.

With reference to the embodiment illustrated in FIG. 1A, the transaction device 100 includes a chassis 102 that houses the components of the transaction device 100, only some of which are illustrated in FIG. 1A. For example, the chassis 100 may house a secure element subsystem 104 that operates to perform the functions of the secure element subsystems and transaction devices discussed below. For example, the secure element subsystem 104 may be provided by tamper-resistant hardware included in the transaction device 100 that is configured to securely host application and securely store data, and may include removable secure element components such as a Universal Integrated Circuit Card (UICC) or a micro Secure Digital (microSD) card, or may include embedded secure element components provided by one or more hardware processors (e.g., a secure element chip or microcontroller). As would be understood by one of skill in the art in possession of the present disclosure, the secure element subsystem 104 may include a central processing unit (CPU), secure microcontrollers, an operating system, memory, a cryptography engine, sensors, timers, random number generators, communication ports, and/or a variety of other secure element subsystems known in the art. In particular, the secure element subsystem 104 may provide security domain(s) for the provisioning of the secure element subsystem components discussed below that prevents tampering, modification, and/or access to those secure element subsystem components that would modify the information stored and/or wallet application functionality discussed below.

In the embodiment illustrated in FIG. 1A, the secure element subsystem 104 includes a wallet application 106 that is configured to generate public/private key pairs, store public/private keys 106a, and use private keys in the public/private key pairs to sign offline transactions in order to create the digital or electronic tokens discussed below. However, one of skill in the art in possession of the present disclosure will recognize that other digital token techniques may be utilized in place of the private-key-signed digital tokens discussed below while remaining within the scope of the present disclosure. For example, the secure element subsystem may store a user profile (e.g., a payer profile, a payee profile, etc.), along with previously created digital tokens (e.g., created by a payment service provider), or a token service provider that is configured to create digital tokens "on-the-fly".

As discussed above, the wallet application 106 may be provided in a security domain included in the secure element subsystem 104 such that the functionality of the wallet application 106 described herein may not be modified by a user of the transaction device 100. For example, with reference to the specific digital token embodiment described above, the functionality of the wallet application 106 in generating the public/private keys 106a may not be modified by a user of the transaction device 100, and the information used by the wallet application 106 to generate the public/private keys 106a may not be accessible by a user of the transaction device 100. In addition, the public/private keys 106a stored after they are created by the wallet application 106 may not be accessible by a user of the transaction device 100, and the functionality of the wallet application 106 in accessing the databases discussed below may not be modified by a user of the transaction device 100. Furthermore, the functionality of the wallet application 106 in interacting with the other subsystems in the transaction device 100 may not be modified by a user of the transaction device 100.

In the embodiment illustrated in FIG. 1A, the secure element subsystem 104 also includes a ledger database 108 and an account database 110 that may each be provided on a secure storage device (not illustrated in FIG. 1A) included in the secure element subsystem 104 and coupled to the wallet application 106. As discussed above, the ledger database 108 and the account database 110 106 may be provided in security domain(s) included in the secure element subsystem 104 such that the information stored in the ledger database 108 and the account database 110 described herein may not be modified by a user of the transaction device 100. For example, with reference to the specific digital token embodiment described above, a secure ledger stored in the ledger database 108 (and updated by the wallet application 106 as described herein) may be not be accessible by a user of the transaction device 100, and an available account balance stored in the account database 110 (and updated by the wallet application 106 as described herein) may be not be accessible by a user of the transaction device 100. In a specific embodiment, the secure element subsystem 104 may be configured to erase any or all information stored within the secure element subsystem 104 (e.g., information utilized to provide the wallet application 106, information stored in the databases 108 and 110, etc.) in response to detecting tampering or other attempted modifications to the secure element subsystem 104. While a specific secure element subsystem 104 has been illustrated and described, one of skill in the art in possession of the present disclosure will recognize that secure element subsystems may provide the functionality described herein via different components and/or different component configurations while remaining within the scope of the present disclosure.

The chassis 102 may also house a wireless communication subsystem 112 that is coupled to the secure element subsystem 104 and, in the specific example illustrated in FIG. 1A, coupled to the wallet application 106 provided in the secure element subsystem 104. In an embodiment, the wireless communication subsystem 112 may include a variety of local and/or peer-to-peer wireless communication devices such as, for example, a BLUETOOTH® wireless communication device, a Near Field Communication (NFC) device, and/or other local/peer-to-peer wireless communication components that would be apparent to one of skill in the art in possession of the present disclosure. In addition, the wireless communication subsystem 112 may include a variety of Internet wireless communication devices such as, for example, a WiFi wireless communication device, a cellular communication device, and/or other Internet wireless communication components that would be apparent to one of skill in the art in possession of the present disclosure.

The chassis 102 may also house each of a display subsystem 114 and an input subsystem 116 that are coupled to the secure element subsystem 104 and, in the specific example illustrated in FIG. 1A, coupled to the wallet application 106 provided in the secure element subsystem 104. In an embodiment, the display subsystem 114 may include a Light Emitting Device (LED) display and/or a variety of display devices that would be apparent to one of skill in the art in possession of the present disclosure, and the input subsystem 116 may include physical buttons, voice recognition subsystems, and/or a variety of input devices that would be apparent to one of skill in the art in possession of the present disclosure. In addition, the display subsystem 114 and the input subsystem 116 may be combined via, for example, a touch input display device. While a specific transaction device 100 has been described, as illustrated and discussed below with reference to FIGS. 1B and 1C, transaction devices may utilizes different subsets of the components illustrated in FIG. 100 to provide a variety of functionality to enable the secure offline payments discussed below while remaining within the scope of the present disclosure.

With reference to FIG. 1B, an example of the transaction device 100 providing a payer transaction device is illustrated. The payer transaction device includes the chassis 102 dimensioned as a "fob" device (e.g., a keychain attachable electronic device), with the display subsystem 114 viewable on a surface of the chassis 102, and the input subsystem 116 provided as input buttons and a security input fingerprint scanner that is integrated with the display device 114 (as indicated by the dashed lines in FIG. 1B). As would be understood by one of skill in the art in possession of the present disclosure, the provisioning of the payer transaction device as the fob device illustrated in FIG. 1B allows a user to attach the payer transaction device to a keychain and perform the secure offline transactions discussed below. However, one of skill in the art in possession of the present disclosure will recognize that the payer transaction device may be provided in a variety of forms (e.g., as the mobile phone illustrated in FIG. 8) while remaining within the scope of the present disclosure.

With reference to FIG. 1C, an example of the transaction device 100 providing a payee transaction device is illustrated. The payee transaction device includes the chassis 102 provided as a "tap input" device, with the display subsystem and input subsystem described in FIG. 1A omitted. As would be understood by one of skill in the art in possession of the present disclosure, the provisioning of the payee transaction device tap input device illustrated in FIG. 1C allows a user to utilize the payee transaction device with another computing device to perform the secure offline transactions discussed below. However, one of skill in the art in possession of the present disclosure will recognize that the payee transaction device may be provided in a variety of forms (e.g., as the mobile phone illustrated in FIG. 8) while remaining within the scope of the present disclosure.

Figure 2:
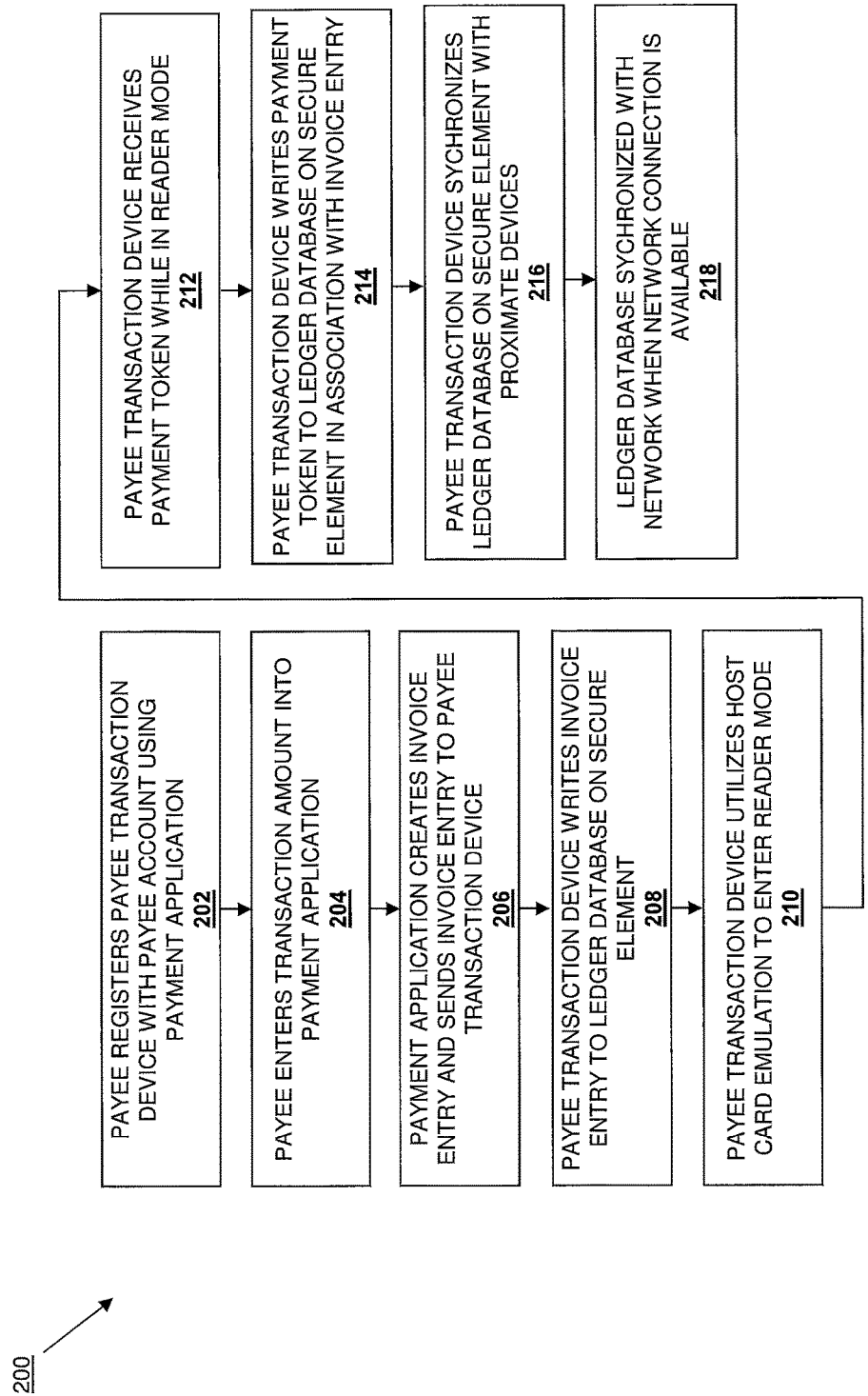
FIG. 2 is a flow chart illustrating an embodiment of a method for performing secure offline payee transactions by a payee.
Figure 3:
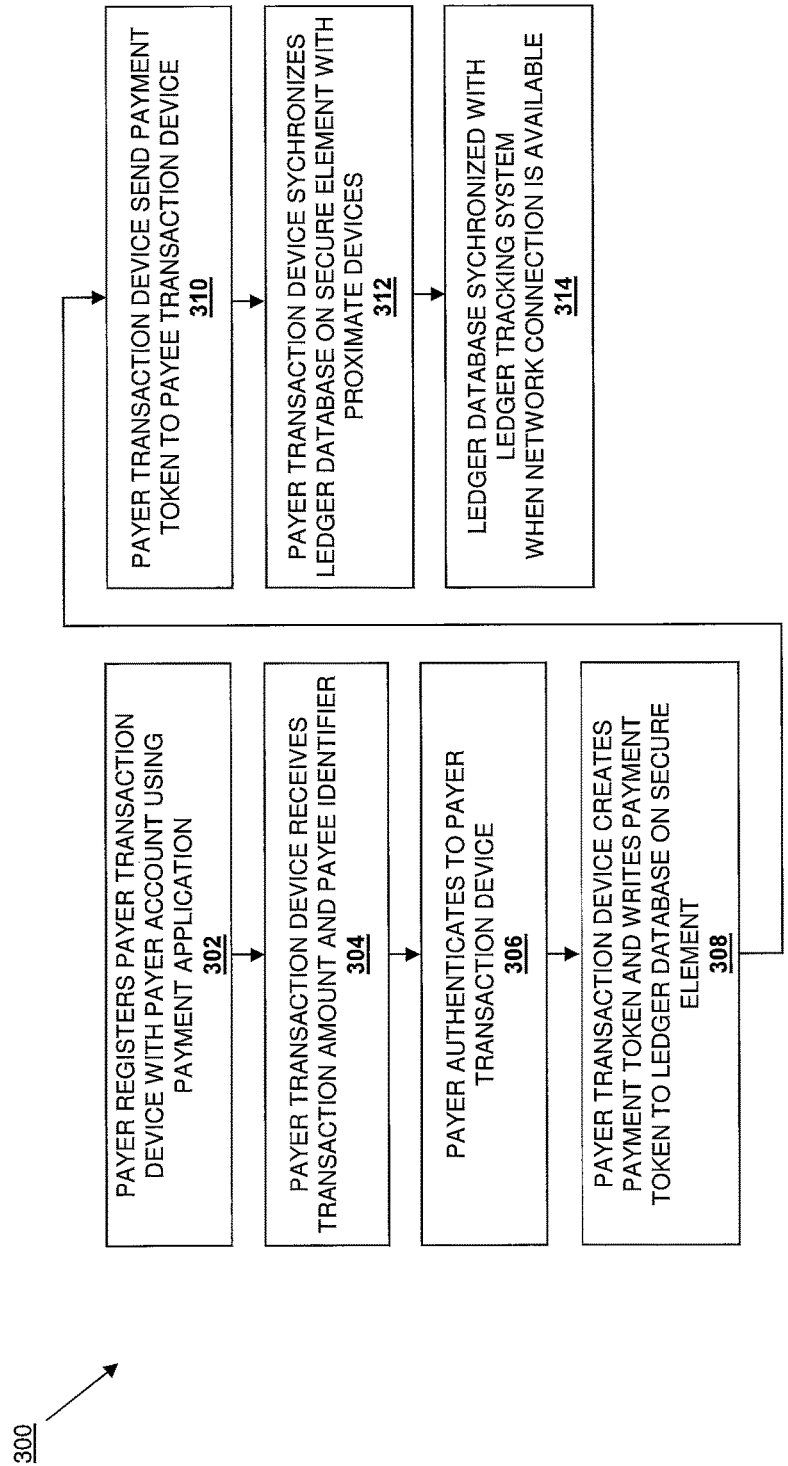
FIG. 3 is a flow chart illustrating an embodiment of a method for performing secure offline payer transactions by a payer.

Referring now to FIGS. 2 and 3, embodiments of methods 200 and 300 for providing secure offline transactions are illustrated. Specifically, the method 200 describes the participation in secure offline transactions by a payee, while the method 300 describes the participation in secure offline transactions by a payer. However, one of skill in the art in possession of the present disclosure will recognize that many portions of the methods 200 and 300 are performed in response to each other, and thus the methods 200 and 300 are described below concurrently to illustrate how the payer and payee transaction devices may interact with each other. As described below, the methods 200 and 300 provide for a secure transaction between a payer and a payee when their respective transaction devices are offline by having the payer transaction device create and/or share a secure digital token as part of the offline transaction with the payee transaction device. Based on the use of a secure element subsystem in the payer transaction device to create and/or share the secure digital token, the payee transaction device may accept the secure digital token as payment for the offline transaction, and that digital token may be shared with an ad-hoc network of other devices. The subsequent synchronization of that digital token by at least one device with at least one ledger tracking system when an Internet connection is subsequently available (e.g., by the payer transaction device, by the payee transaction device, and/or by a local device) provides for the actual transfer of funds between the payer and the payee.

In an embodiment, a payment service provider such as, for example, PayPal Inc. of San Jose, Calif., United States, may operate to provide payment accounts, payment applications, payment services, and/or other payment service provider functionality that would be apparent to one of skill in the art in possession of the present disclosure. For example, the payment service provider may include a payment service provider system (e.g., a plurality of server devices and/or other computing components) that allows users to register for payment accounts and link financial accounts to allow funds to be transferred to and from the those payment accounts, download payment applications that enable the users to access, manage, and/or otherwise utilize those payment accounts, and/or enable a variety of other payment service functionality. As such, prior to the method 200, a payee may have obtained a payee payment account, downloaded a payee payment application, and/or performed other steps that enable the functionality discussed below. Similarly, prior to the method 300, a payer may have obtained a payer payment account, downloaded a payee payment application, and/or performed other steps that enable the functionality discussed.

Figure 4:
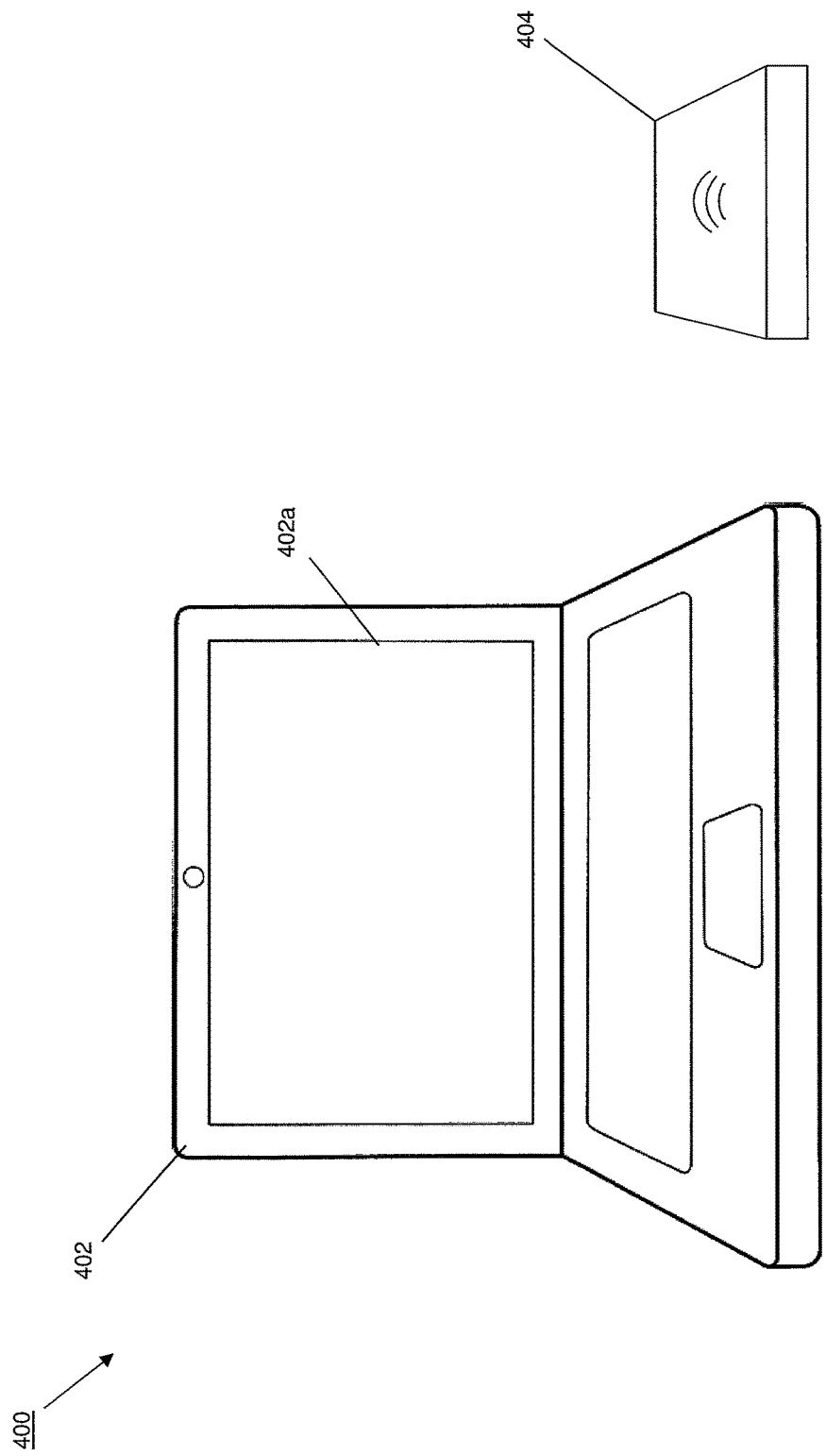
FIG. 4 is a perspective view illustrating an embodiment of a payee computing device operating with the payee transaction device of FIG. 1C.

The method 200 begins at block 202 where a payee registers a payee transaction device with a payee account using a payment application. With reference to FIG. 4, an embodiment of a payee transaction system 400 including a payee computing device 402 and a payee transaction device 404 are illustrated. In the example discussed below, the payee computing device 402 is illustrated as a laptop/ notebook computing device having a display device 402*a*, and may include a variety of other laptop/notebook computing components that would be apparent to one of skill in the art in possession of the present disclosure. However, one of skill in the art in possession of the present disclosure will recognize that other types of computing devices may be provided in place of the laptop computing device illustrated in FIG. 4 while remaining within the scope of the present disclosure. The payee transaction system 400 also includes the payee transaction device 404 that may be substantially similar to the payee transaction device illustrated in FIGS. 1A and 1C. In some embodiments, the functionality of payee computing device 402 and the payee transaction device 404 may be combined. However, the embodiment of the payee transaction system 400 is provided to illustrate how the payee transaction device 404 may be provided as a simplified peripheral component for any user with a computing device in order to enable the secure offline transaction described herein.

At block 202, the payee may utilize a payment application (described above) running on the payee computing device 402 to register the payee transaction device 404 with a payee payment account. As discussed above, the payee may have a payment account provided by a payment service provider, and may have downloaded a payment application from a payment service provider system to the payee computing device 402. At block 202, the payee may utilize a communication system in the payee computing device 402 to communicate with the payee transaction device 404 (e.g., via its wireless communication subsystem 112) to enable the payment application to register the payee transaction device 404 with the payee payment account. For example, the payee computing device 402 may communicate with the payee transaction device 404 at block 202 via a local/peer-to-peer wireless connection (e.g., BLUETOOTH®, NFC, etc.), via an Internet wireless connection (e.g., WiFi), via a wired connection (e.g., a USB cable connected to each of the payee computing device 402 and the payee transaction device 404), and/or in a variety of other manners that would be apparent to one of skill in the art in possession of the present disclosure.

In an embodiment, the secure element subsystem 106 in the payee transaction device 404 includes a unique identifier that may be associated with the payee transaction device 404, and at block 202 the payment application on the payee computing device 402 may retrieve that unique identifier and provide it via an Internet connection to the payment service provider for association with the payee payment account. In another embodiment, the payee payment account may include a unique identifier, and at block 202 the payment application on the payee computing device 402 may retrieve that unique identifier and provide it to the payee transaction device 404 for storage in the secure element subsystem 104 (e.g., by the wallet application 106). In a specific example, payee transaction devices may be registered to payee payment accounts via a seamless onboarding on an activation terminal located at Kiosks or shops with users bio-metrics based authentication. However, while specific examples of the registration of the payee transaction device 404 with the payee payment account have been described, one of skill in the art in possession of the present disclosure will recognize that payee transaction devices may be registered with payee payment accounts in a variety of manners that will fall within the scope of the present disclosure.

Figure 5:
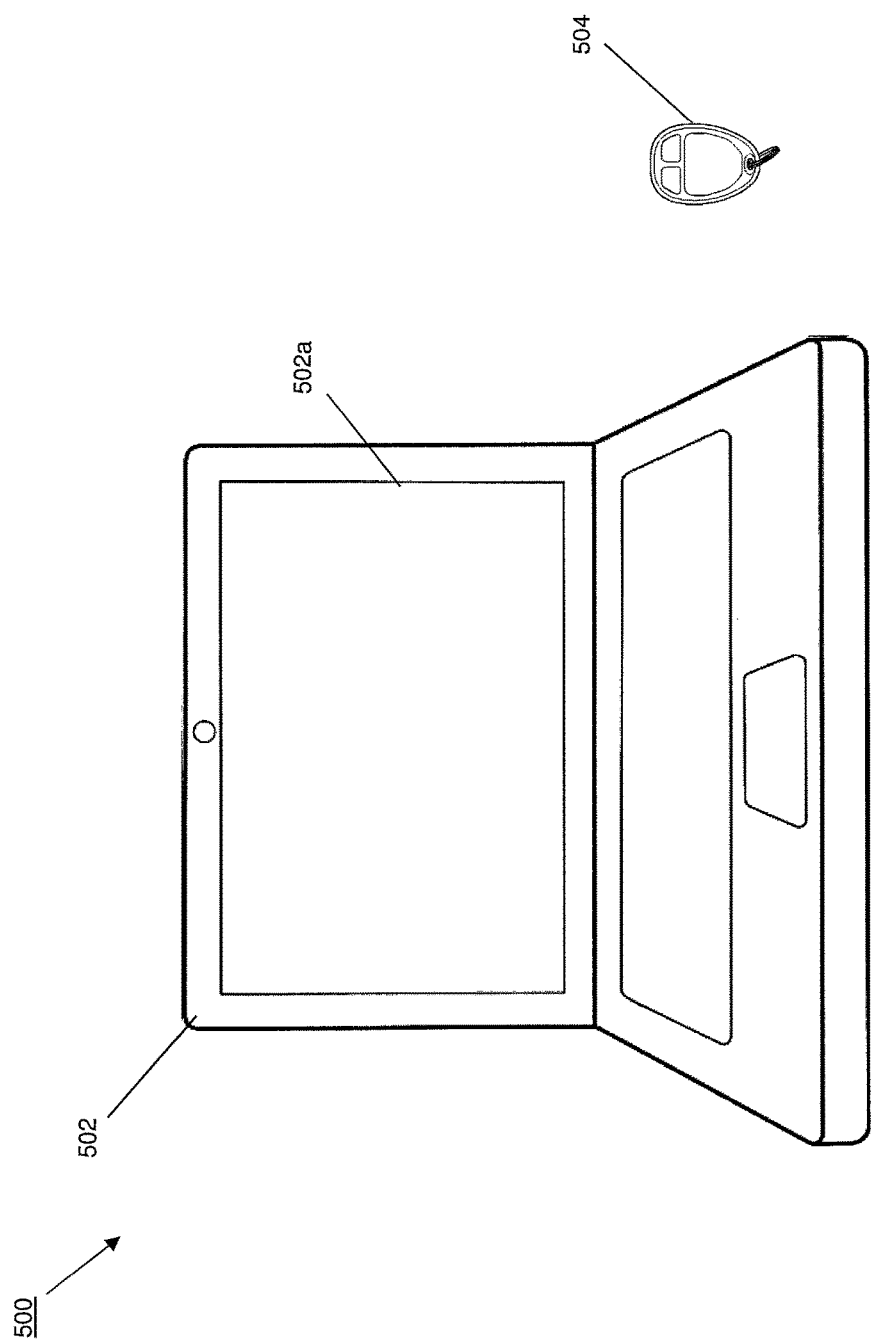
FIG. 5 is a perspective view illustrating an embodiment of a payer computing device operating with the payer transaction device of FIG. 1B.

Similarly, the method 300 begins at block 302 where a payer registers a payer transaction device with a payer account using a payment application. With reference to FIG. 5, an embodiment of a payer transaction system 500 including a payer computing device 502 and a payer transaction device 504 are illustrated. In the example discussed below, the payer computing device 502 is illustrated as a laptop/notebook computing device having a display device 502*a*, and may include a variety of other laptop/notebook computing components that would be apparent to one of skill in the art in possession of the present disclosure. However, one of skill in the art in possession of the present disclosure will recognize that other types of computing devices may be provided in place of the laptop computing device illustrated in FIG. 5 while remaining within the scope of the present disclosure. The payer transaction system 500 also includes the payer transaction device 504 that may be substantially similar to the payer transaction device illustrated in FIGS. 1A and 1B. In some embodiments, the functionality of payer computing device 502 and the payer transaction device 504 may be combined. However, the embodiment of the payer transaction system 500 is provided to illustrate how the payer transaction device 504 may be provided as a simplified fob device to enable any user to perform the secure offline transaction described herein.

At block 302, the payer may utilize a payment application (described above) running on the payer computing device 502 to register the payer transaction device 504 with a payer payment account. As discussed above, the payer may have a payment account provided by a payment service provider, and may have downloaded a payment application from a payment service provider system to the payer computing device 502. At block 302, the payer may utilize a communication system in the payer computing device 502 to communicate with the payer transaction device 504 (e.g., via its wireless communication subsystem 112) to enable the payment application to register the payer transaction device 504 with the payer payment account. For example, the payer computing device 502 may communicate with the payer transaction device 504 at block 302 via a local/peer-to-peer wireless connection (e.g., BLUETOOTH®, NFC, etc.), via an Internet wireless connection (e.g., WiFi), via a wired connection (e.g., a USB cable connected to each of the payer computing device 502 and the payer transaction device 504), and/or in a variety of other manners that would be apparent to one of skill in the art in possession of the present disclosure.

In an embodiment, the secure element subsystem 106 in the payer transaction device 504 includes a unique identifier that may be associated with the payer transaction device 504, and at block 302 the payment application on the payer computing device 502 may retrieve that unique identifier and provide it via an Internet connection to the payment service provider for association with the payer payment account. In another embodiment, the payer payment account may include a unique identifier, and at block 302 the payment application on the payer computing device 502 may retrieve that unique identifier and provide to the payer transaction device 504 for storage in the secure element subsystem 104 (e.g., by the wallet application 106). In some embodiments, the registration of the payer transaction device 504 includes the payer providing authentication information such as the fingerprint scan discussed below, a username/password combination, and/or a variety of other authentication information known in the art. However, while specific examples of the registration of the payer transaction device 504 with the payer payment account have been described, one of skill in the art in possession of the present disclosure will recognize that payer transaction devices may be registered with payer payment accounts in a variety of manners that will fall within the scope of the present disclosure.

Following blocks 202 and 302 of the methods 200 and 300, respectively, each of the payer and the payee includes a transaction device that is registered to their respective payment accounts. The registration of the transaction devices with payment accounts may be followed by the transaction devices retrieving and storing a variety of information. In an embodiment, subsequent to block 302, the payer transaction device 504 may operate to connect to the payment service provider system via the Internet, retrieve a payer account balance, and store that payer account balance. For example, the wallet application 106 in the secure element subsystem 104 on the payer transaction device 504 may utilize the wireless communication subsystem 112 to connect to the payment service provider system via the Internet, retrieve a payer account balance associated with an available balance in the payer payment account, and store the payer account balance in the account database 110 in the secure element subsystem 104 on the payer transaction device 504. In addition, the wallet application 106 in the secure element subsystem 104 on the payer transaction device 404 may utilize the wireless communication subsystem 112 to connect to the payment service provider system via the Internet, retrieve ledger information, and store the ledger information in the ledger database 108 in the secure element subsystem 104 on the payer transaction device 504. In embodiments where the storage capacity of the payer transaction device 504 is sufficient, the ledger information may include an entire blockchain of transaction associated with a crypto currency. However, in embodiments in which the storage capacity of the payer transaction device 504 is limited, the ledger information may only include transactions from a blockchain that are associated with public addresses that are controlled by the payer (e.g., for which the wallet application 106 includes private keys that can sign transactions to transfer funds stored in those public addresses).

Similarly, subsequent to block 202 the payee transaction device 404 may also operate to connect to the payment service provider system via the Internet, retrieve a payee account balance, and store that payee account balance. For example, the wallet application 106 in the secure element subsystem 104 on the payee transaction device 404 may utilize the wireless communication subsystem 112 to connect to the payment service provider system via the Internet, retrieve a payee account balance associated with an available balance in the payee payment account, and store the payee account balance in the account database 110 in the secure element subsystem 104 on the payee transaction device 404. In addition, the wallet application 106 in the secure element subsystem 104 on the payee transaction device 404 may utilize the wireless communication subsystem 112 to connect to the payment service provider system via the Internet, retrieve ledger information, and store the ledger information in the ledger database 108 in the secure element subsystem 104 on the payee transaction device 404. In embodiments where the storage capacity of the payee transaction device 404 is sufficient, the ledger information may include an entire blockchain of transaction associated with a crypto currency. However, in embodiments in which the storage capacity of the payee transaction device 404 is limited, the ledger information may only include transactions from a blockchain that are associated with public addresses that are controlled by the payee (e.g., for which the wallet application 106 includes private keys that can sign transactions to transfer funds stored in those public addresses).

While a few specific examples of information retrieved by the payee transaction device 404 and the payer transaction device 504 subsequent to the registration performed at blocks 202 and 302 has been described, one of skill in the art in possession of the present disclosure will recognize that the transaction devices may retrieve and store other information while remaining within the scope of the present disclosure as well. For example, as discussed above, the transaction devices may retrieve and securely store respective user profiles (e.g., the payer transaction device 504 may store a payer profile, the payee transaction device 404 may store a payee profile), digital tokens (e.g., digital tokens created by a token service provider (TSP) and/or the payment service provider), and/or a variety of other information that may be utilized to provide the functionality discussed below.

Figure 6A:
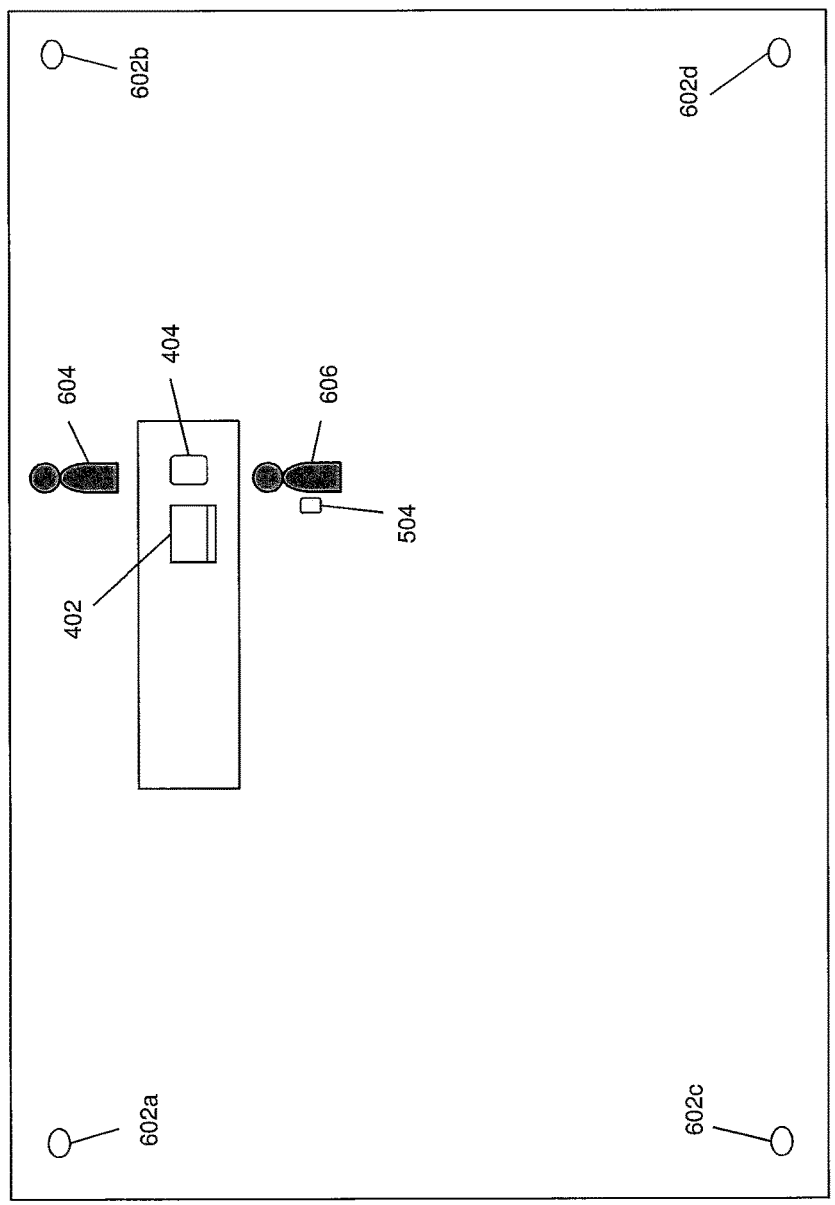
FIG. 6A is a schematic view illustrating a payer and a payee performing an offline transaction at a payee physical location.

With their payer and payee transaction devices registered with their respective payment accounts, the payer and the payee may participate in a secure offline transaction. FIG. 6A illustrates an embodiment of a physical payee location 600 that, in the embodiments discussed below, includes a plurality of local devices 602a, 602b, 602c, and 602d that may be provided by beacon devices and/or any other device capable of the local/peer-to-peer wireless communications discussed below. A payee 604 is illustrated with the payee computing device 402 and the payee transaction device 404 discussed above with reference to FIG. 4, and a payer 606 is illustrated with the payer transaction device 404 discussed above with reference to FIG. 5. In the embodiments discussed below, an Internet connection is not available to any of the payee transaction device 404, the payer transaction device 504, the payee computing device 402, and the local devices 602a-d during the offline transaction, but may become available subsequent to that offline transaction. However, one of skill in the art in possession of the present disclosure will recognize that a variety of offline/online transaction scenarios may benefit from the teachings of the present disclosure, and thus will fall within its scope as well.

Figure 6B:
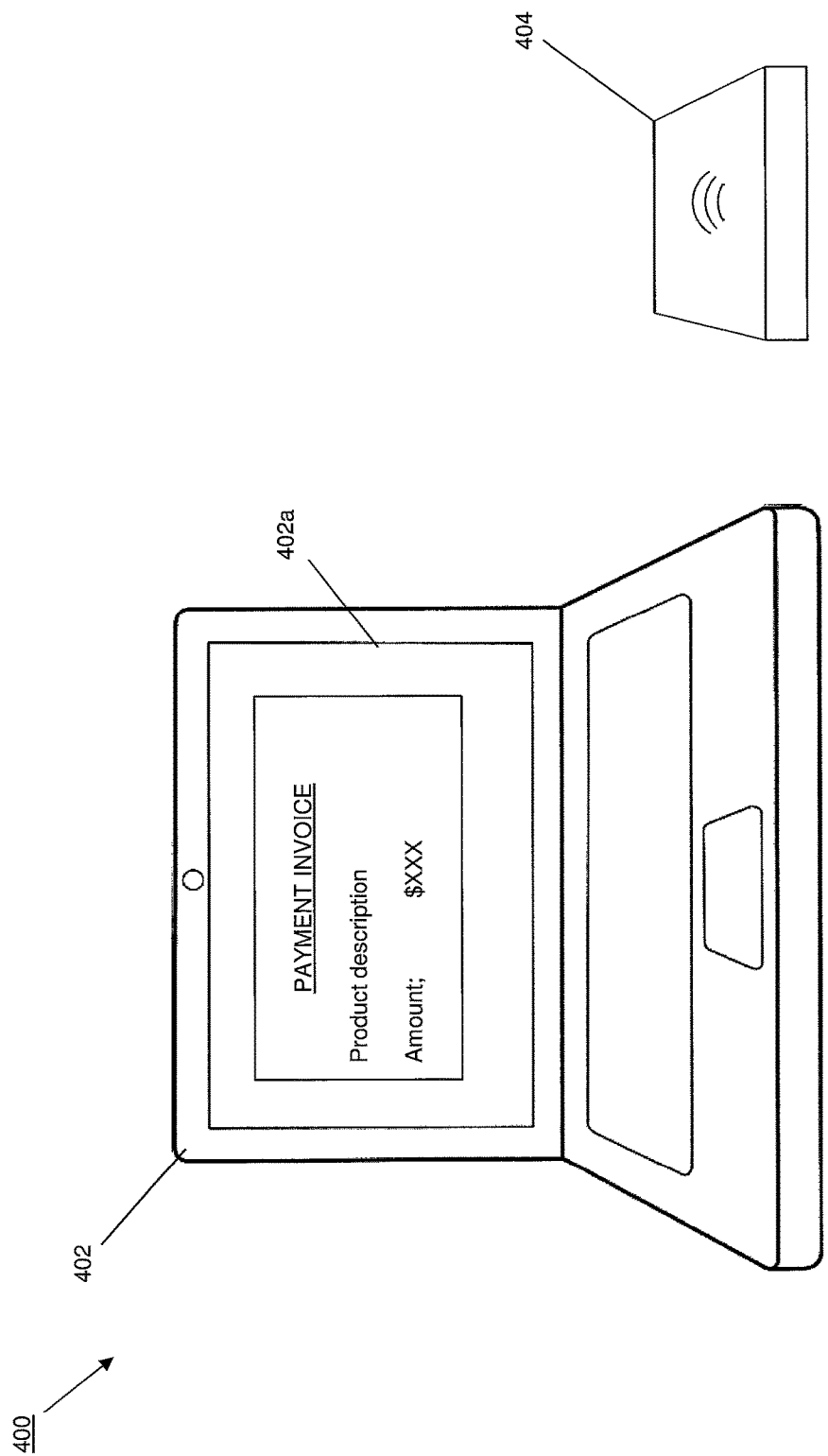
FIG. 6B is a perspective view illustrating an embodiment of the payee computing device and the payee transaction device of FIG. 4 performing a portion of an offline transaction.

Referring back to FIG. 2, the method 200 may then proceed to block 204 where the payee enters a transaction amount into a payment application running on the payee computing device 402. For example, the payer 606 may select goods and/or services offered by the payee 604, and in some embodiments of block 204 the payee 604 may then identify a cost of those goods and/or services in the payment application running on the payee computing device 402, determine additional amounts (e.g., taxes, fees, etc.) that need to be paid by the payer 606 in the payment application running on the payee computing device 402, and confirm a transaction amount in the payment application running on the payee computing device 402 that is the total of the cost and additional amounts. FIG. 6B illustrates the payee computing device 402 displaying a payment invoice on its display device 402a, and one of skill in the art in possession of the present disclosure will recognize how the payment invoice may include a variety of information in addition to the transaction amount discussed above.

In response to the entering of the transaction amount, the method 200 may then proceed to block 206 where the payment application creates an invoice entry and sends the invoice entry to the payee transaction device. For example, upon receiving the confirmed transaction amount at block 204, the payment application running on the payee computing device 402 may create an invoice entry and communicate that invoice entry to wallet application 106 on the payee transaction device 404 (through the wireless communication subsystem 112). For example, the invoice entry may include a payee identifier, the transaction amount, a description of the goods and/or services, and/or any other invoice information that would be apparent to one of skill in the art in possession of the present disclosure. In a specific example, the payee identifier may include a public address that is controlled by the payee (e.g., a public address for which the wallet application 106 has access to a private key for signing transactions that transfer funds from that public address).

In response to receiving the invoice entry, the method 200 proceeds to block 208 where the wallet application 104 on the payee transaction device 404 operates to write the invoice entry to a payee secure ledger stored in the ledger database 108 in the secure element subsystem 104 on the payee transaction device 404. For example, at block 208, the wallet application 106 may write an entry into the ledger that indicates that the transaction amount is expected to be provided to the public address controller by the payee and communicated as part of the payee identifier received by the payee transaction device 404.

The method 200 may then proceed to block 208 where the payee transaction device utilizes host card emulation to enter a reader mode. In an embodiment, subsequent to the writing the invoice entry to the ledger database 108 at block 208, the secure element subsystem 104 and the wireless communication subsystem 116 in the payee transaction device 404 may operate to act as a reader for host card emulation devices (e.g., the payer transaction device 504 in the example described below).

Referring back to FIG. 3 and the method 300, at block 304, the payer transaction device may receive a transaction amount and a payee identifier. In some embodiments, the payer transaction device 504 may receive the transaction amount and the payee identifier at block 304 from the payee computing device 402 or the payee transaction device 404. For example, at block 304, a local/peer-to-peer wireless connection may be established between the payer transaction device 504 and either or both of the payee computing device 402 or the payee transaction device 404 (e.g., using the wireless communication subsystems 116 in the payee transaction device 404 and the payer transaction device 504). As such, the transaction amount and the payee identifier may be provided by the payee computing device 402 or the payee transaction device 404 to the payer transaction device 504 as part of the invoice entry created at block 206 of the method 200 and/or written to the ledger database 108 at block 208 of the method 200. In another embodiment, the payer 606 may provide the transaction amount and the payee identifier to the payer transaction device 504 by, for example, utilizing the display subsystem 114 and the input subsystem 116 to enter that transaction amount into the payer transaction device 504, utilizing a camera included on the payer transaction device 504 to capture an image of a Quick Response (QR) code that encodes the transaction amount and the payee identifier, and/or in a variety of manners that would be apparent to one of skill in the art in possession of the present disclosure. FIG. 6C illustrates the payer transaction device 504 displaying a transaction amount 608 and a payee identifier 610 that one of skill in the art in possession of the present disclosure will recognize is a crypto currency public address, although other payee identifiers will fall within the scope of the present disclosure as well.

Figure 6D:
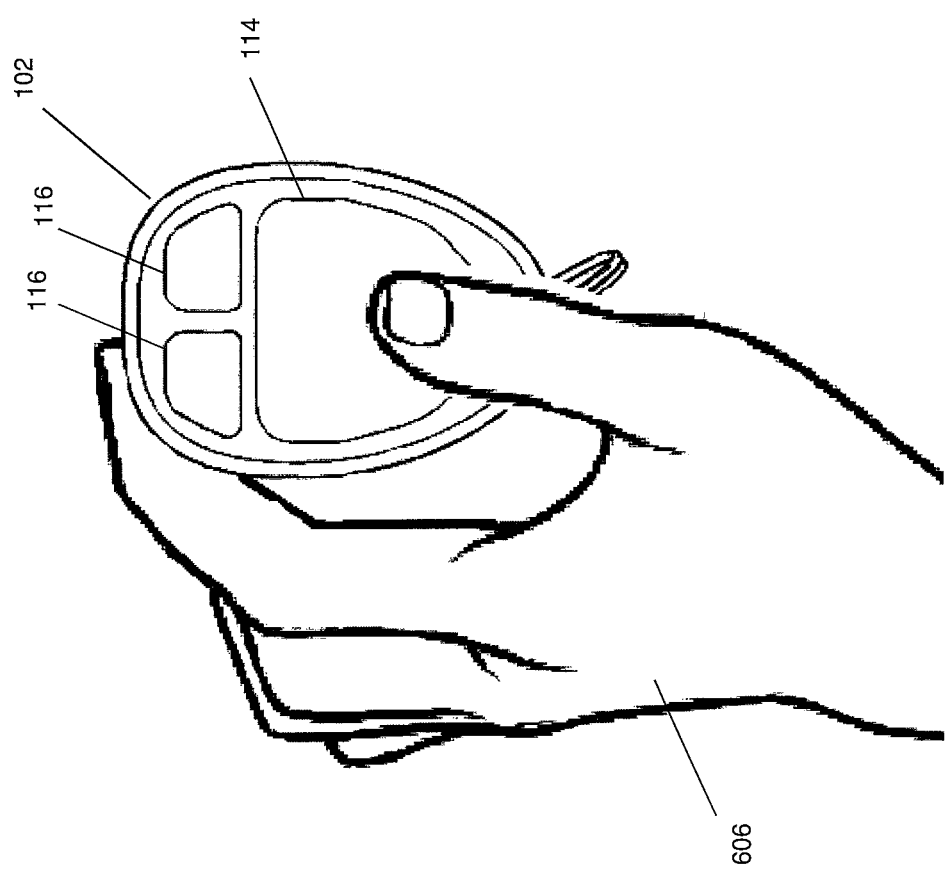
FIG. 6D is a perspective view illustrating an embodiment of payer authenticating to the payer transaction device of FIG. 1B to perform a portion of an offline transaction.

In response to the payer transaction device receiving the transaction amount at block 304, the method 300 may proceed to block 306 where the payer authenticates to the payer transaction device. For example, FIG. 6D illustrates the payer 606 placing their thumb on the security input fingerprint scanner that is integrated with the display device 114 (as indicated by the dashed lines in FIG. 1B) in order to authenticate to the payer transaction device 504. However, authentication via a username/password combination, two-factor authentication methods, and/or a variety of other authentication techniques will fall within the scope of the present disclosure as well. With reference back to FIG. 6C, following authentication to the payer transaction device 504, the payer 606 may select the input button on the input subsystem 116 that is adjacent the display of "PAY" on the display subsystem 114, or select the input button on the input subsystem 116 that is adjacent the display of "CANCEL" on the display subsystem 114.

In response to selecting the input button on the input subsystem 116 that is adjacent the display of "PAY" on the display subsystem 114, the wallet application 106 on the secure element subsystem 104 in the payer transaction device 504 may operate to determine whether the transaction amount received at block 304 is less than or equal to the payer account balance stored in the account database 110 on the secure element subsystem 104 in the payer transaction device 504. The determination of whether the payer account balance is sufficient to satisfy the transaction amount (as described below) is but one of a plurality of checks that may be performed before the wallet application 106 on the secure element subsystem 104 in the payer transaction device 504 or the payee transaction device 404 allows the payer 606 to proceed in a transaction with the payee 604. In other examples, the wallet application may be configured to review risk models stored on its transaction device to determine whether to allow a transaction to go forward, determine transaction frequency (e.g., no more than four transactions and/or $50 USD in transactions per day) to determine whether to allow a transaction to go forward, and/or provide a variety of other transaction security features that would be apparent to one of skill in the art in possession of the present disclosure.

If the payer 504 selects the input subsystem 116 that is adjacent the display of "CANCEL" on the display subsystem 114, or the wallet application 106 on the secure element subsystem 104 in the payer transaction device 504 determines that the transaction amount received at block 304 is greater than the payer account balance stored in the account database 110 on the secure element subsystem 104 in the payer transaction device 504, the offline transaction may be cancelled. As such, the wallet application 106 on the secure element subsystem 104 in the payer transaction device 504 may prevent the payer 504 from participating in transactions with transaction amounts that are greater than the available payer account balance stored in the account database 110 on the secure element subsystem 104 in the payer transaction device 504.

However, if the payer 504 selects the input subsystem 116 that is adjacent the display of "PAY" on the display subsystem 114, and the wallet application 106 on the secure element subsystem 104 in the payer transaction device 504 determines that the transaction amount received at block 304 is less than or equal to the payer account balance stored in the account database 110 on the secure element subsystem 104 in the payer transaction device 504, the method 300 proceeds to block 308 where the payer transaction device 504 writes a digital token to the ledger database 108 on its secure element subsystem 104. In an embodiment, at block 308, the wallet application 106 may access the ledger database 108 on the secure element subsystem 104 in the payer transaction device 504 and determine at least one public address that is associated with funds that are sufficient to satisfy the transaction amount, then access the public/private keys 106a to determine the private key(s) that were used to create those public address(es), and then use those private key(s) to sign transactions that are configured to transfer the funds associated with the public addresses to the payee 604 (e.g., the public address provided by the payee identifier) in an amount equal to the transaction amount. As such, in some embodiments, the digital token created at block 308 may include one or more private-key-signed transactions, although the use of pre-stored or TSP-created digital tokens, as well as other types of digital tokens, will fall within the scope of the present disclosure as well.

The wallet application on the secure element subsystem 104 in the payer transaction device 504 may then write the digital token to a secure payer ledger in the ledger database 108 on the secure element subsystem 104 in the payer transaction device 504. For example, the wallet application on the secure element subsystem 104 in the payer transaction device 504 may write the private-key-signed transactions to a block in a secure payer ledger in the ledger database 108 on the secure element subsystem 104 in the payer transaction device 504.

Figure 6E:
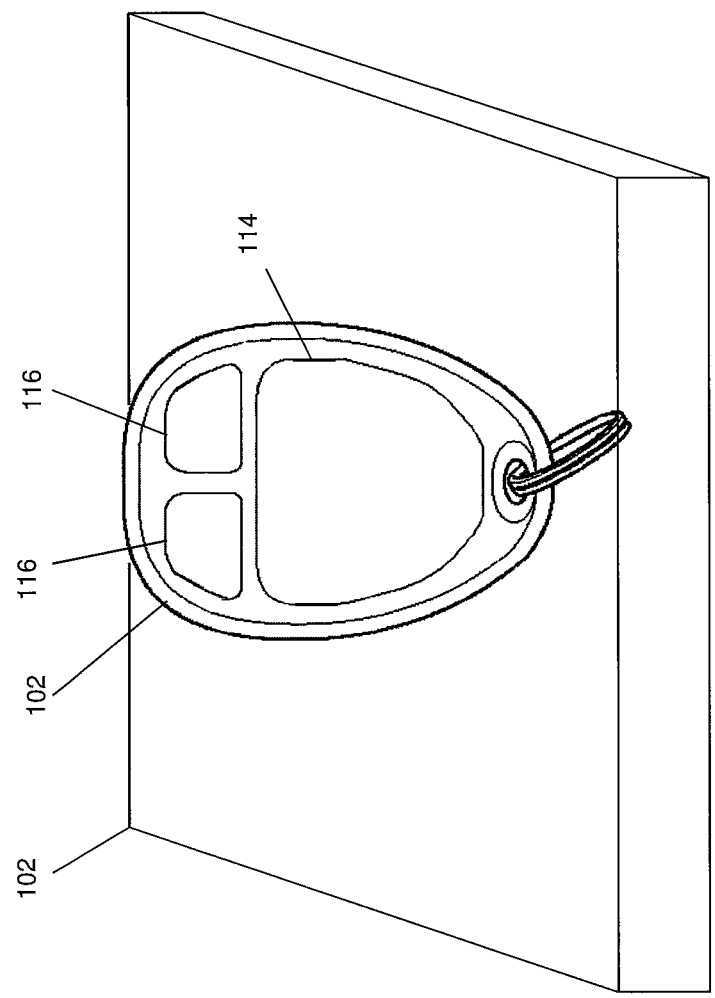
FIG. 6E is a perspective view illustrating an embodiment of the payer transaction device of FIG. 1B and the payee transaction device of FIG. 1C performing a portion of an offline transaction.

The method 300 then proceeds to block 310 where the payer transaction device sends the digital token to the payee transaction device. In an embodiment, the wallet application 106 on the secure element subsystem 104 in the payer transaction device 504 may use the wireless communication subsystem 112 in the payer transaction device 504 to transmit the private-key-signed transactions over the local/peer-to-peer wireless connection with the payee transaction device 404. FIG. 6E illustrates the user 606 moving the payer transaction device 504 adjacent the payee transaction device 404 and, in some cases into physical contact (e.g., a "tap"), in order to transmit the private-key-signed transactions over the local/peer-to-peer wireless connection with the payee transaction device 404. For example, with reference back to the method 200, following the payee transaction device 404 utilizing host card emulation to enter reader mode at block 210, the moving of the payer transaction device 504 adjacent to and/or in contact with the payee transaction device 404 as illustrated in FIG. 6E causes the method 200 to proceed to block 212 where the payee transaction device receives the digital token while in reader mode. In addition, at block 310 of the method 300, the wallet application 104 and the wireless communication subsystem 112 in the payer transaction device 504 may utilize host card emulation to enter a transmit mode, and at block 212 the payee transaction device 404 operating in the reader mode will receive the private-key-signed transactions from the payer transaction device 504 operating in the transmit mode (e.g., in response to the "tapping" of the two transaction devices).

The method 200 then proceeds to block 214 where the payee transaction device writes the digital token to the ledger database on its secure element subsystem in association with the invoice entry. In an embodiment, the wallet application on the secure element subsystem 104 in the payee transaction device 404 may write the digital token to a secure payee ledger in association with the invoice entry in the ledger database 108 on the secure element subsystem 104 in the payer transaction device 504, and mark that digital token as "processed". For example, the wallet application on the secure element subsystem 104 in the payee transaction device 404 may write the private-key-signed transactions to a block in a secure payee ledger in the ledger database 108 on the secure element subsystem 104 in the payer transaction device 504 in association with the invoice entry that was written to the secure payee ledger at block 208 of the method 200 (e.g., identifying the public address that was to receive funds from the payer equal to the transaction amount).

The methods 200 and 300 then proceed to blocks 216 and 312, respectively, where the payee transaction device and the payer transaction device synchronize their ledger databases on their secure element subsystems with proximate devices. In an embodiment, at blocks 216 and 300, the wallet application on the secure element subsystems 104 in the payee transaction device 404 and/or the payer transaction device 504 may use the wireless communication subsystem 112 in the payee transaction device and/or the payer transaction device 504 to transmit the private-key-signed transactions over the local/peer-to-peer wireless connection with the local devices 602a-d (e.g., beacon devices in this example), as well as any other device they come into local/peer-to-peer wireless communication (e.g., other payer devices, Internet of Things (IoT) devices, etc.). As such, an ad-hoc wireless network may be created with the payee transaction device 404 and/or the payer transaction device 504 to distribute the digital token at blocks 216 and 31 to devices they come into contact with, and those devices may distribute that payment token to other devices in a similar manner.

The methods 200 and 300 then proceed to blocks 218 and 314, respectively, where the ledger databases are synchronized with a ledger tracking system when a network connection is available. In an embodiment, at blocks 218 and 314, any of the devices storing the digital token utilized in the offline transaction (e.g., a secure ledger including the payment token that was provided on that device) may share that digital token (e.g., synchronize that secure ledger) with a ledger tracking system. For example, following the sending of the digital token to the payee transaction device 404 (and the writing of the digital token to its secure payee ledger by the payee transaction device 404 to complete the offline transaction), the payer transaction device 504 may find a connection to the Internet and, in response, synchronize the secure payer ledger with a ledger tracking system through the Internet. As such, the wallet application on the secure element subsystem 104 in the payer transaction device 504 may detect that a connection to the Internet has been established via its wireless communication subsystem 112 and, in response, operate to synchronize the secure payer ledger in the secure payer ledger database (which includes the digital token created at block 308) with a ledger tracking system (e.g., one or more computing devices that operate to maintain a ledger).

In another example, following the writing of the digital token to its secure payee ledger by the payee transaction device 404 to complete the offline transaction, the payee transaction device 504 may find a connection to the Internet and, in response, synchronize the secure payee ledger with a ledger tracking system through the Internet. As such, the wallet application 106 on the secure element subsystem 104 in the payee transaction device 404 may detect that a connection to the Internet has been established via its wireless communication subsystem 112 and, in response, operate to synchronize the secure payee ledger in the secure payee ledger database (which includes the digital token created at block 308) with a ledger tracking system (e.g., one or more computing devices that operate to maintain a ledger).

In yet another example, following the synchronization of the secure payer and/or payee ledgers by the payee transaction device 404 and/or the payer transaction device 504, the local devices 602a-d (or any other devices that have been proximate to the payer transaction device 504 and/or payee transaction device 404 to synchronize the ledger databases at blocks 218 and/or 314) may find a connection to the Internet and, in response, synchronize the ledger databases with a ledger tracking system through the Internet. As such, creation and writing of the digital token to the secure payer ledger by the payer transaction device 504, as well as the sending of that digital token to the payee transaction device and/or proximate devices, distributes that digital token via an ad-hoc network and ultimately causes that digital token to be subsequently synchronized to a ledger tracking system via the Internet, whether that be accomplished by the payer transaction device 504, the payee transaction device 404, the local devices 602a-d, and/or any other devices that come within local/peer-to-peer wireless contact with the payer transaction device 504 or payee transaction device 404 subsequent to the offline transaction.

The synchronization of the secure ledgers to the ledger tracking system allows the ledger tracking system to validate the digital token, reconcile the entries in different secure ledgers, and process actual payments between parties. As such, identification of the digital token created by the payer transaction device 504 at block 308 allows the ledger tracking system (e.g., the payment service provider system, a distributed network of computers that operate to maintain a public ledger such as a blockchain) to process the transaction and transfer funds from the payer account to the payee account.

Thus, systems and methods have been described that provide for secure transactions between a payer and a payee when their respective transaction devices are offline by having the payer transaction device create a secure digital token as part of the offline transaction and share it with the payee transaction device. Due to the use of a secure element subsystem in the payer transaction device to create the secure digital token, the payee transaction device may confidently accept the secure digital token as payment for the offline transaction, and the synchronization of that digital token with at least one ledger tracking system when an Internet connection is subsequently available (e.g., by the payer transaction device, by the payee transaction device, and/or by a device that receives that digital token from the payer transaction device and/or the payee transaction device) provides for the actual transfer of funds between the payer and the payee by the ledger tracking system.

Figure 7:
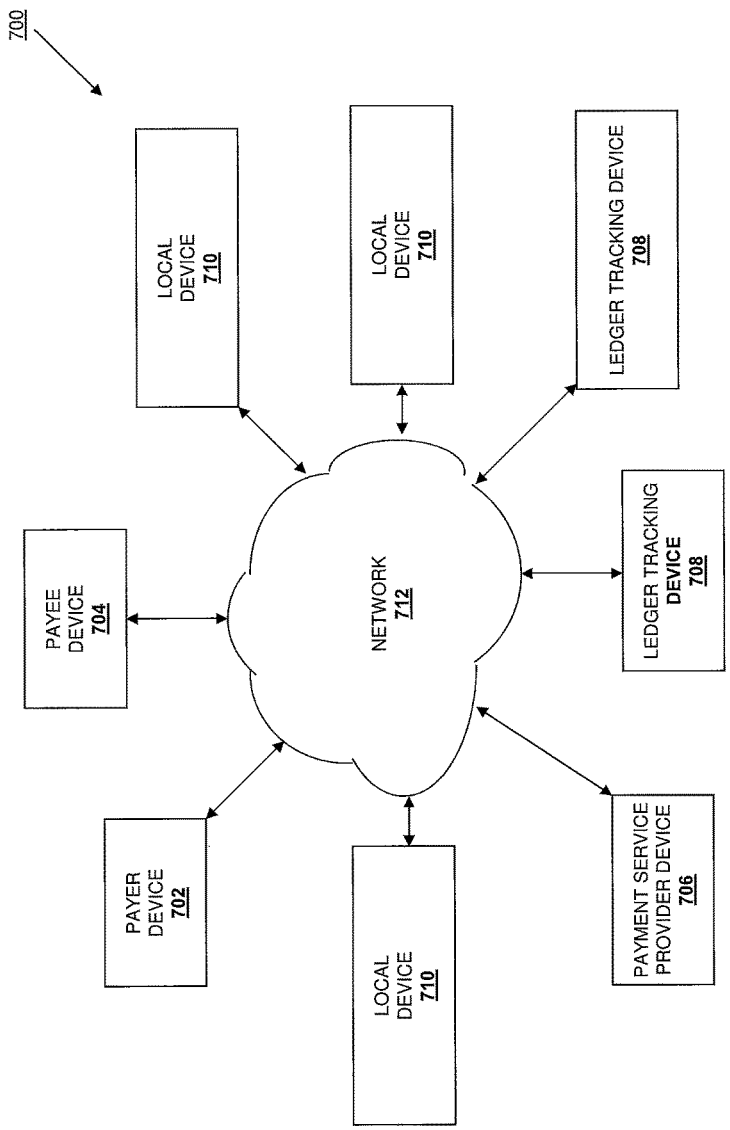
FIG. 7 is a schematic view illustrating an embodiment of a networked system.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 includes a payer device 702, a payee device 704, a payment service provider device 706, ledger tracking devices 708, and local devices 710 that may be configured to communicate over one or more networks 712. The payer device 702 and the payee device 704 may be any of the transaction devices discussed above, and the payer device 704 may include the payee computing device 402 as well. The payment service provider device 706 may be the payment service provider devices discussed above and may be operated by a payment service provider such as, for example, PayPal Inc. of San Jose, Calif. The ledger tracking devices 708 may be the ledger tracking devices discussed above, and the local devices 710 may be local devices 602a-d discussed above.

The payer device 702, payee device 704, payment service provider device 706, ledger tracking devices 708, and local devices 710 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 712.

The network 712 may be implemented as a single network or a combination of multiple networks. For example, in various embodiments, the network 712 may include the Internet and/or one or more intranets, landline networks, wireless networks, and/or other appropriate types of networks.

The payer device 702 may be implemented using any appropriate combination of hardware and/or software configured for wired and/or wireless communication over network 712. For example, in one embodiment, the payer device 702 may be implemented as a personal computer of a user in communication with the Internet. In other embodiments, the payer device 702 may be a smart phone, personal digital assistant (PDA), laptop computer, and/or other types of computing devices.

The payer device 702 may include one or more browser applications which may be used, for example, to provide a convenient interface to permit the payer to browse information available over the network 710. For example, in one embodiment, the browser application may be implemented as a web browser configured to view information available over the Internet.

The payer device 702 may also include one or more toolbar applications which may be used, for example, to provide user-side processing for performing desired tasks in response to operations selected by the payer. In one embodiment, the toolbar application may display a user interface in connection with the browser application.

The payer device 702 may further include other applications as may be desired in particular embodiments to provide desired features to the payer device 702. In particular, the other applications may include a payment application for payments assisted by a payment service provider through the payment service provider device 706. The other applications may also include security applications for implementing user-side security features, programmatic user applications for interfacing with appropriate application programming interfaces (APIs) over the network 712, or other types of applications. Email and/or text applications may also be included, which allow the payer to send and receive emails and/or text messages through the network 712. The payer device 702 includes one or more user and/or device identifiers which may be implemented, for example, as operating system registry entries, cookies associated with the browser application, identifiers associated with hardware of the payer device 702, or other appropriate identifiers, such as a phone number. In one embodiment, the user identifier may be used by the payment service provider device 706 to associate the user with a particular account as further described herein.

The payee device 704 may be maintained, for example, by a conventional or on-line merchant, conventional or digital goods seller, individual seller, and/or application developer offering various products and/or services in exchange for payment to be received conventionally or over the network 712. In this regard, the payee device 704 may include a database identifying available products and/or services (e.g., collectively referred to as items) which may be made available for viewing and purchase by the payer.

The payee device 704 also includes a checkout application which may be configured to facilitate the purchase by the payer of items. The checkout application may be configured to accept payment information from the user through the payer device 702 and/or from the payment service provider through the payment service provider device 706 over the network 712.

Figure 8:
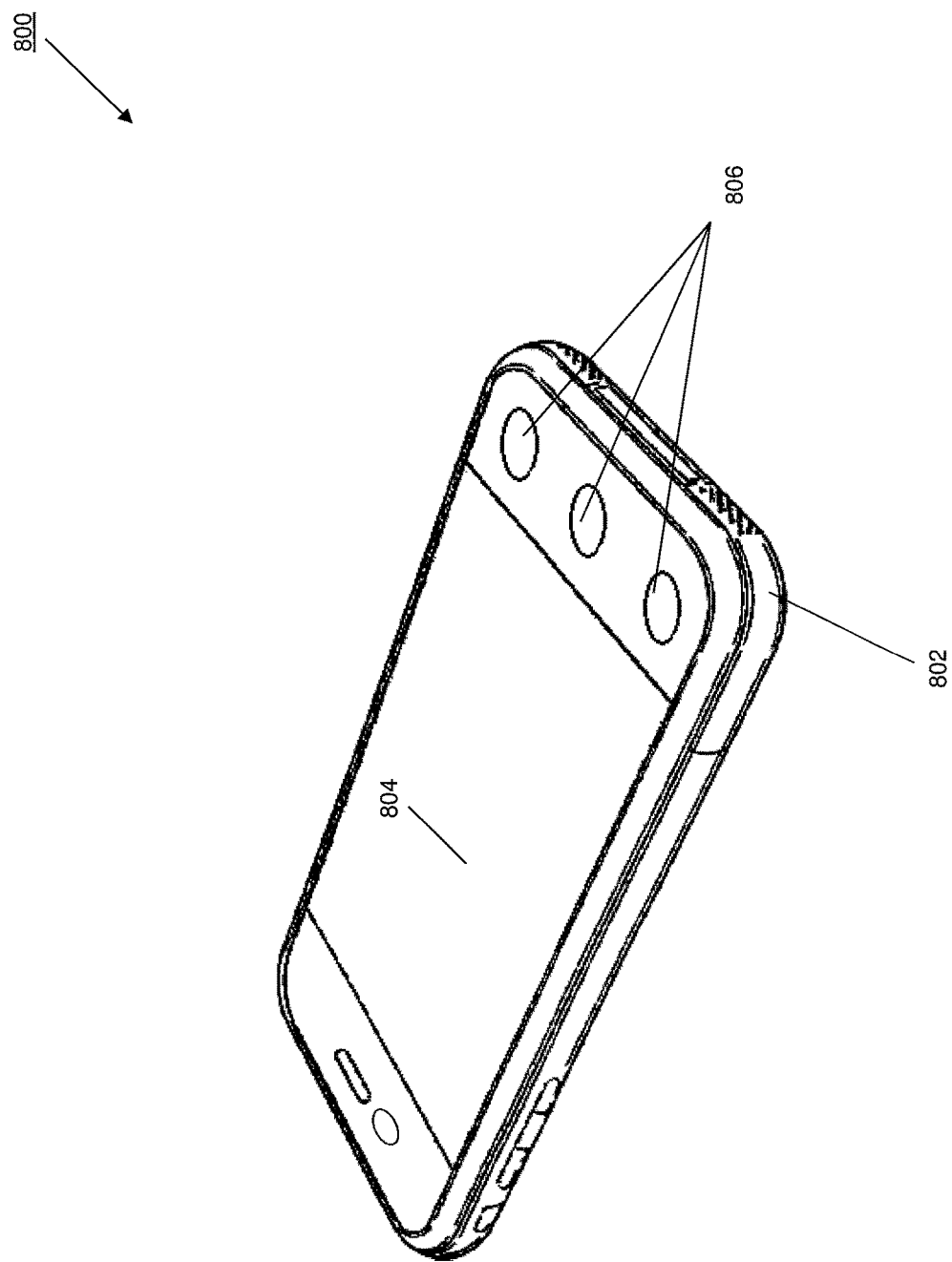
FIG. 8 is a perspective view illustrating an embodiment of a transaction device.

Referring now to FIG. 8, an embodiment of a transaction device 800 is illustrated. The transaction device 800 may be the payer and/or payee transaction devices discussed above. The payer device 800 includes a chassis 802 having a display 804 and an input device including the display 804 and a plurality of input buttons 7806. One of skill in the art will recognize that the payer device 800 is a portable or mobile phone including a touch screen input device and a plurality of input buttons that allow the functionality discussed above with reference to the methods 200 and 300. However, a variety of other portable/mobile payer devices and/or desktop payer devices may be used in the methods 200 and 300 without departing from the scope of the present disclosure.

Figure 9:
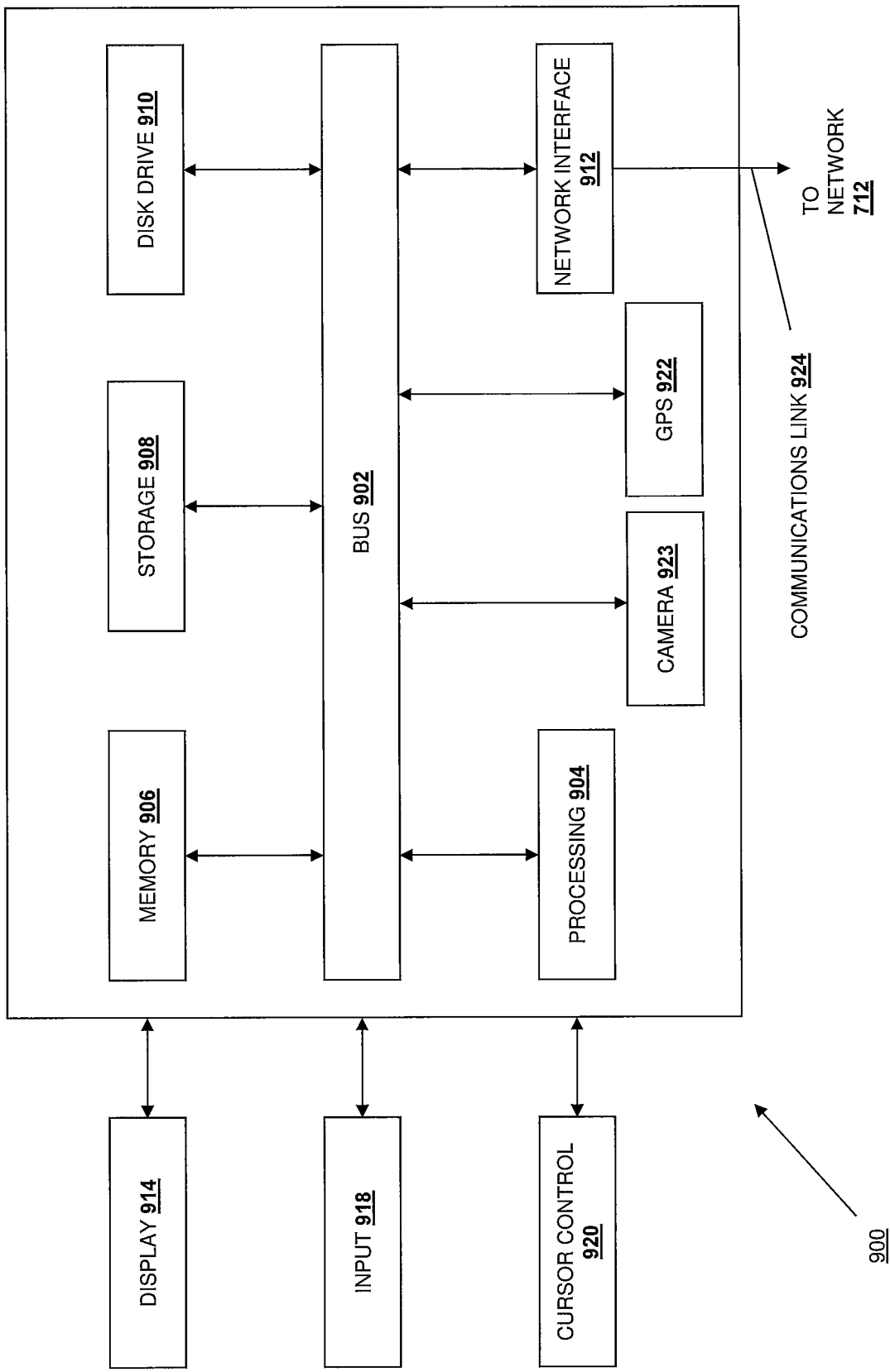
FIG. 9 is a schematic view illustrating an embodiment of a computer system.

Referring now to FIG. 9, an embodiment of a computer system 900 suitable for implementing, for example, the transaction and/or other devices discussed above. It should be appreciated that other devices utilized by payer, payees, and payment service providers in the system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 892 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the payer and payee transaction devices discussed above. Such instructions may be read into the system memory component 906 from another computer readable medium, such as the static storage component 908 or the disk drive component 8910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 900 coupled by a communication link 924 to the network 712 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A secure offline transaction system, comprising:
a chassis;
a wireless communication subsystem located in the chassis; and
a secure element subsystem that is located in the chassis and coupled to the wireless communication subsystem, wherein the secure element subsystem incudes:
  a secure payer account database that stores an available payer account balance;
  a secure ledger database that stores a payer secure ledger; and
  a wallet application that is coupled to the secure payer account database and the secure ledger database, wherein the wallet application is configured, while the wireless communication subsystem is not connected to an Internet, to:
    receive a first payee identifier and a first transaction amount;
    verify that the first transaction amount is less than the available payer account balance stored in the secure payer account database;
    create, in response to verifying that the first transaction amount is less than the available payer account balance, a digital token that allocates the first transaction amount from the available payer account balance to the first payee identifier;
    record the digital token in the payer secure ledger as part of a first transaction, wherein the recording of the digital token in the payer secure ledger reduces the available payer account balance by the first transaction amount;
    establish, using the wireless communication subsystem, a first peer-to-peer wireless connection with a payee transaction device;
    transfer, over the first peer-to-peer wireless connection, the digital token to the payee transaction device;
    establish an ad-hoc network with a plurality of local devices using a plurality of peer-to-peer wireless connections;
    distribute the digital token to the plurality of local devices using the ad-hoc network; and
    synchronize the payer secure ledger and a plurality of local secure ledgers for the plurality of local devices based on distributing the digital token,
    wherein the wallet application is configured, subsequent to recording the digital token in the payer secure ledger and transferring the digital token to the payee transaction device, to:
      establish, via the wireless communication subsystem, an Internet connection when that Internet connection becomes available; and
      broadcast, over the Internet connection when that Internet connection becomes available, the digital token such that the digital token is synchronized with at least one ledger tracking system.

2. The system of claim 1, wherein the creating the digital token that allocates the first transaction amount from the payer account balance to the payee identifier includes:
signing the first transaction with a private key that corresponds to a public address that holds at least some of the available payer account balance; and
wherein the recording the digital token in the payer secure ledger as part of the first transaction includes:
adding the signed first transaction to the payer secure ledger.

3. The system of claim 1, wherein the wallet application is further configured, subsequent to recording the digital token in the payer secure ledger and transferring the digital token to the payee transaction device, to:
detect that the Internet connection has become available via the wireless communication subsystem prior to establishing, via the wireless communication subsystem, the Internet connection.

4. The system of claim 1, wherein transferring the digital token to the payee transaction device comprises requesting that the payee transaction device adds the digital token to a payee secure ledger and subsequently broadcasts the digital token via an available Internet connection.

5. The system of claim 1, wherein distributing the digital token to the plurality of local devices comprises further requesting that the plurality of local devices broadcast the digital token via an available Internet connection.

6. The system of claim 1, wherein the wallet application is further configured, while the wireless communication subsystem is not connected to the Internet, to:
receive a second payee identifier and a second transaction amount;
determine that the second transaction amount is greater than the available payer account balance stored in the secure payer account database; and
prevent the creation of a digital token that allocates the second transaction amount from the payer account balance to the second payee identifier.

7. A method for performing secure offline transactions, comprising:
receiving, by a wallet application included in a secure element subsystem provided on a payer transaction device while the payer transaction device is not connected to an Internet, a first payee identifier and a first transaction amount;

verifying, by the wallet application while the payer transaction device is not connected to the Internet, that the first transaction amount is less than an available payer account balance stored in a secure payer account database included in the secure element subsystem provided on a payer transaction device;

creating, by the wallet application in response to verifying that the first transaction amount is less than the available payer account balance and while the payer transaction device is not connected to the Internet, a digital token that allocates the first transaction amount from the available payer account balance to the first payee identifier;

recording, by the wallet application as part of a first transaction while the payer transaction device is not connected to the Internet, the digital token in a payer secure ledger stored in a secure ledger database included in the secure element subsystem provided on the payer transaction device, wherein the recording of the digital token in the payer secure ledger reduces the available payer account balance by the first transaction amount;

establishing a first peer-to-peer wireless connection with a payee transaction device;

transferring, by the wallet application over the first peer-to-peer wireless connection while the payer transaction device is not connected to the Internet, the digital token to the payee transaction device;

establishing an ad-hoc network with a plurality of local devices using a plurality of peer-to-peer wireless connections;

distributing the digital token to the plurality of local devices using the ad-hoc network;

synchronizing the payer secure ledger and a plurality of local secure ledgers for the plurality of local devices based on distributing the digital token;

establishing, subsequent to recording the digital token in the payer secure ledger and transferring the digital token to the payee transaction device, an Internet connection when that Internet connection becomes available; and broadcasting, by the wallet application over the Internet connection when that Internet connection becomes available, the digital token such that the digital token is synchronized with at least one ledger tracking system.

8. The method of claim 7, wherein the creating the digital token that allocates the first transaction amount from the payer account balance to the payee identifier includes:

signing, by the wallet application, the first transaction with a private key that corresponds to a public address that holds at least some of the available payer account balance; and wherein the recording the digital token in the payer secure ledger as part of the first transaction includes:
adding, by the wallet application, the signed first transaction to the payer secure ledger.

9. The method of claim 7, further comprising:
detecting, by the wallet application, that the Internet connection has become available prior to establishing the Internet connection.

10. The method of claim 7, wherein the transferring, by the wallet application via the first peer-to-peer wireless connection subsequent to recording the digital token in the payer secure ledger the digital token to the payee transaction device comprises requesting that the payee transaction device adds the digital token to a payee secure ledger and subsequently broadcasts the digital token via an available Internet connection.

11. The method of claim 7, wherein the distributing the digital token to the plurality of local devices further comprises requesting that the plurality of local devices broadcast the digital token via an available Internet connection.

12. The method of claim 7, further comprising:
receiving, by the wallet application while the payer transaction device is not connected to the Internet, a second payee identifier and a second transaction amount;

determining, by the wallet application while the payer transaction device is not connected to the Internet, that the second transaction amount is greater than the available payer account balance stored in the secure payer account database; and preventing, by the wallet application while the payer transaction device is not connected to the Internet, the creation of a digital token that allocates the second transaction amount from the payer account balance to the second payee identifier.

13. The method of claim 7, wherein the receiving the first payee identifier and the first transaction amount includes:
receiving, by the wallet application over the first peer-to-peer wireless connection while the payer transaction device is not connected to the Internet, the first payee identifier and the first transaction amount from the payee transaction device.

14. A non-transitory machine-readable medium having stored thereon machine-readable instructions executable to cause a machine to perform operations comprising:

receiving, in a secure element subsystem provided on a payer transaction device while the payer transaction device is not connected to an Internet, a first payee identifier and a first transaction amount;

verifying, in the secure element subsystem while the payer transaction device is not connected to the Internet, that the first transaction amount is less than an available payer account balance stored in a secure payer account database included in the secure element subsystem provided on a payer transaction device;

creating, in the secure element subsystem in response to verifying that the first transaction amount is less than the available payer account balance and while the payer transaction device is not connected to the Internet, a digital token that allocates the first transaction amount from the available payer account balance to the first payee identifier;

recording, in the secure element subsystem as part of a first transaction while the payer transaction device is not connected to the Internet, the digital token in a payer secure ledger stored in a secure ledger database included in the secure element subsystem provided on the payer transaction device, wherein the recording of the digital token in the payer secure ledger reduces the available payer account balance by the first transaction amount;

establishing, in the secure element subsystem, a first peer-to-peer wireless connection with a payee transaction device;

transferring, in the secure element subsystem over the first peer-to-peer wireless connection while the payer transaction device is not connected to the Internet, the digital token to the payee transaction device;

establishing an ad-hoc network with a plurality of local devices using a plurality of peer-to-peer wireless connections;

distributing the digital token to the plurality of local devices using the ad-hoc network;

synchronizing the payer secure ledger and a plurality of local secure ledgers for the plurality of local devices based on distributing the digital token;

establishing, in the secure element subsystem subsequent to recording the digital token in the payer secure ledger and transferring the digital token to the payee transaction device, an Internet connection when that Internet connection becomes available; and broadcasting, in the secure element subsystem over the Internet connection when that Internet connection becomes available, the digital token such that the digital token is synchronized with at least one ledger tracking system.

15. The non-transitory machine-readable medium of claim 14, wherein the creating the digital token that allocates the first transaction amount from the payer account balance to the payee identifier includes:

signing, in the secure element subsystem, the first transaction with a private key that corresponds to a public address that holds at least some of the available payer account balance; and wherein the recording the digital token in the payer secure ledger as part of the first transaction includes:

adding, in the secure element subsystem, the signed first transaction to the payer secure ledger.

16. The non-transitory machine-readable medium of claim 14, wherein the operations further comprise:

detecting, in the secure element subsystem, that the Internet connection has become available prior to establishing, via the wireless communication subsystem, the Internet connection.

17. The non-transitory machine-readable medium of claim 14, wherein the transferring, in the secure element subsystem subsequent to recording the digital token in the payer secure ledger, the digital token to the payee transaction device comprises requesting that the payee transaction device adds the digital token to a payee secure ledger and broadcast the digital token via an available Internet connection.

18. The non-transitory machine-readable medium of claim 14, wherein the distributing the digital token to the plurality of local devices further comprises requesting that the plurality of local devices broadcast the digital token via an available Internet connection.

19. The non-transitory machine-readable medium of claim 14, wherein the operations further comprise:

receiving, in the secure element subsystem while the payer transaction device is not connected to the Internet, a second payee identifier and a second transaction amount;

determining, in the secure element subsystem while the payer transaction device is not connected to the Internet, that the second transaction amount is greater than the available payer account balance stored in the secure payer account database; and preventing, in the secure element subsystem while the payer transaction device is not connected to the Internet, the creation of a digital token that allocates the second transaction amount from the payer account balance to the second payee identifier.

20. The non-transitory machine-readable medium of claim 19, wherein the receiving the first payee identifier and the first transaction amount includes:

receiving, in the secure element subsystem over the first peer-to-peer wireless connection while the payer transaction device is not connected to the Internet, the first payee identifier and the first transaction amount from the payee transaction device.

* * * * *